US009722986B2

(12) United States Patent
Brands et al.

(10) Patent No.: US 9,722,986 B2
(45) Date of Patent: *Aug. 1, 2017

(54) ELECTRONIC TOOL AND METHODS FOR MEETINGS

(75) Inventors: Johannes Willem Brands, Hoeilaart (BE); Ronny Rudy Dewaele, Zonnebeke (BE)

(73) Assignee: BARCO N.V., Kortrijk (BE)

(*) Notice: Subject to any disclaimer, the term of this patent is extended or adjusted under 35 U.S.C. 154(b) by 0 days.

This patent is subject to a terminal disclaimer.

(21) Appl. No.: 14/395,364

(22) PCT Filed: Sep. 14, 2012

(86) PCT No.: PCT/EP2012/068169
§ 371 (c)(1),
(2), (4) Date: Oct. 17, 2014

(87) PCT Pub. No.: WO2013/156092
PCT Pub. Date: Oct. 24, 2013

(65) Prior Publication Data
US 2015/0121466 A1    Apr. 30, 2015

(30) Foreign Application Priority Data

Apr. 18, 2012 (GB) .................................. 1206841.7

(51) Int. Cl.
G06F 15/16 (2006.01)
H04L 29/06 (2006.01)
H04L 12/18 (2006.01)

(52) U.S. Cl.
CPC .......... *H04L 63/08* (2013.01); *H04L 12/1818* (2013.01); *H04L 65/403* (2013.01); *H04L 12/1822* (2013.01); *H04L 12/1827* (2013.01)

(58) Field of Classification Search
CPC ..... H04L 12/1827; H04L 63/08; H04L 29/06; H04L 65/403; H04N 7/15
(Continued)

(56) References Cited

U.S. PATENT DOCUMENTS 6,966,035 B1  11/2005 Suess et al.
8,316,138 B2  11/2012 Chang
(Continued)

FOREIGN PATENT DOCUMENTS

CN    1476242 A    2/2004
CN    1499841 A    5/2004
(Continued)

OTHER PUBLICATIONS

International Search Report (ISR) dated Mar. 6, 2013, for PCT/EP2012/068166.
(Continued)

*Primary Examiner* — Evans Desrosiers
(74) *Attorney, Agent, or Firm* — Bacon & Thomas, PLLC

(57) ABSTRACT

An electronic meeting tool and method for communicating arbitrary media content from users at a meeting. These can include a node configuration device adapted to operate a display node of a communications network, the display node being coupled to a first display. The node configuration device is adapted to receive user selected arbitrary media content and to control display of the user selected arbitrary media content on the first display. At least one peripheral device adapted to communicate the user selected arbitrary media content via the communications network is provided, where the peripheral device is a connection unit including: (e) a connector adapted to couple to a port of a processing device having a second display, a memory and an operating system; and (f) a transmitter for communicating with the communications network.

23 Claims, 11 Drawing Sheets

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | |
|---|---|---|
| 8,346,753 B2 | 1/2013 | Hayes |
| 2002/0174254 A1 | 11/2002 | Kita et al. |
| 2002/0196378 A1 | 12/2002 | Slobodin et al. |
| 2004/0128354 A1 | 7/2004 | Horikiri et al. |
| 2004/0263636 A1 | 12/2004 | Cutler et al. |
| 2005/0015719 A1 | 1/2005 | Marchon et al. |
| 2005/0036509 A1 | 2/2005 | Acharya et al. |
| 2005/0122392 A1 | 6/2005 | Johansen |
| 2006/0031779 A1* | 2/2006 | Theurer ............... G06F 3/1454 715/781 |
| 2006/0095376 A1 | 5/2006 | Mitchell et al. |
| 2007/0005809 A1 | 1/2007 | Kobayashi et al. |
| 2007/0033289 A1 | 2/2007 | Nuyttens et al. |
| 2007/0109410 A1 | 5/2007 | Siew |
| 2007/0244970 A1 | 10/2007 | Watanabe et al. |
| 2009/0046139 A1 | 2/2009 | Cutler et al. |
| 2009/0064302 A1 | 3/2009 | Colella |
| 2009/0198839 A1 | 8/2009 | Banerjee et al. |
| 2009/0300520 A1 | 12/2009 | Ashutosh |
| 2010/0066806 A1 | 3/2010 | Lyu |
| 2010/0087139 A1 | 4/2010 | Glass et al. |
| 2010/0302130 A1 | 12/2010 | Kikuchi et al. |
| 2011/0023096 A1* | 1/2011 | Xiao ................... H04L 63/0236 726/5 |
| 2011/0092198 A1 | 4/2011 | Miyata |
| 2011/0115689 A1 | 5/2011 | Sugiyama et al. |
| 2011/0150433 A1 | 6/2011 | Alexandrov et al. |
| 2011/0179182 A1 | 7/2011 | Vadla Ravnas |
| 2012/0331509 A1 | 12/2012 | Laksono |
| 2013/0050254 A1 | 2/2013 | Tran et al. |
| 2013/0060662 A1 | 3/2013 | Carlson et al. |
| 2013/0067121 A1 | 3/2013 | Beel et al. |
| 2014/0082227 A1 | 3/2014 | Beel et al. |

FOREIGN PATENT DOCUMENTS

| | | |
|---|---|---|
| CN | 1550996 | 12/2004 |
| CN | 1689275 A | 10/2005 |
| CN | 1788494 A | 6/2006 |
| CN | 101022529 A | 8/2007 |
| CN | 101106469 A | 1/2008 |
| CN | 101106681 A | 1/2008 |
| CN | 101442500 A | 5/2009 |
| CN | 101828392 A | 9/2010 |
| CN | 101965609 | 2/2011 |
| CN | 101631223 | 4/2011 |
| CN | 102023852 A | 4/2011 |
| CN | 102045864 A | 5/2011 |
| CN | 101454762 | 6/2013 |
| EP | 1187480 A1 | 3/2002 |
| EP | 1246395 A1 | 10/2002 |
| EP | 1385336 A2 | 1/2004 |
| WO | 00/52887 A1 | 9/2000 |
| WO | 2007/137415 A1 | 12/2007 |
| WO | 2010/105335 A1 | 9/2010 |

OTHER PUBLICATIONS

International Search Report (ISR) dated Mar. 19, 2013, for PCT/EP2012/068167.
International Search Report (ISR) dated Mar. 4, 2013, for PCT/EP2012/068168.
German Search Report dated Nov. 17, 2011, for DE 102011055443.2.
British Search Report dated Aug. 28, 2012, for GB 1206841.7.
Martin Trautschold, iPhone 4 Made Simple, 2010, Apress, pp. 1-819.
Jiang et al., "Free Speech: A Novel Wireless Approach for Conference Projecting and Cooperating", Lecture Notes in Computer Science, vol. 4159, pp. 688-697, 2006. (cited in GB 1206841.7 Search Report).
European Office Communication dated Jun. 15, 2015, for EP 12762258.7.
International Search Report (ISR) dated Jan. 28, 2013 for PCT/EP2012/068169.
Written Opinion dated Jan. 28, 2013 for PCT/EP2012/068169.
International Preliminary Report on Patentability (IPRP) dated Aug. 13, 2014 for PCT/EP2012/068169.
Marc Al-Hames et al., Audio-Visual Processing in Meetings: Seven Questions and Current AMI Answers, 2006.
Mood indicators on electronic meeting tools IBM, IP.com No. IPCOMOOOO1171D, Publication Date: Mar. 12, 2003.
European Office Communication dated Dec. 21, 2015, for EP 12762258.7.
European Office Action dated Aug. 1, 2016, for EP 12762258.7.
U.S. Office Action dated Jun. 17, 2016, for U.S. Appl. No. 14/278,442.
U.S. Office Action dated Jun. 17, 2016, for U.S. Appl. No. 14/725,401.
Chinese Office Action dated Dec. 27, 2016, for CN 201280074077.2, and English translation thereof.
Final Office Action in corresponding U.S. Appl. No. 14/725,401 dated Jan. 26, 2017.
Final Office Action in corresponding U.S. Appl. No. 14/278,442 dated Jan. 26, 2017.
Chinese Office Action dated Nov. 4, 2016, for CN 201280001542.X, and English translation thereof.
European Extended Search Report dated Nov. 3, 2016, for EP 16170760.9.
Chinese Office Action dated Oct. 14, 2016, for CN 201280055744.2.
Chinese Office Action dated Oct. 10, 2016, for CN 201280055667.0.
Office Action in corresponding U.S. Appl. No. 14/344,830 dated Oct. 6, 2016.
Chinese Office Action dated Apr. 5, 2017, for CN 201280055744.2, and English translation thereof.
U.S. Office Action dated May 3, 2017, for U.S. Appl. No. 14/344,836.

* cited by examiner

ELECTRONIC TOOL AND METHODS FOR MEETINGS

The present invention relates to electronic tools for meetings including methods or devices for providing connection to a communications network, to networks or methods of operating the network, methods or devices for use in displaying media content as well as software for performing any of these methods.

TECHNICAL BACKGROUND

Tools for Collaboration

Allowing ad hoc groups of persons to communicate with each other is one of the fundamental aspects of collaboration, problem solving, negotiation, teaching and education, etc. To assist in communication, there has been an explosion of electronic communication tools such as electronic conferencing tools, e.g. synchronous and asynchronous conferencing, online chat, Instant Messaging, audio conferencing, videoconferencing, data conferencing, application sharing, remote desktop sharing, electronic meeting systems, collaborative management (coordination) tools, project management systems, knowledge management systems, and social software systems.

One classic approach is the lecture or seminar often involving a presentation using presentation software. To a large extent the traditional single person presentation or lecture has been maintained with the audience being in a rather passive mode as far as determining, constructing, augmenting or modifying the information to be presented is concerned.

As with other business processes, meetings are going digital. Increasingly, people are using computer technology alone and in conjunction with broadband networks to support their meeting objectives prior to and during an actual meeting. For example, e-mail is used to pass around files for people to read prior to a meeting.

Collaborative workspaces in corporate networks and on the Internet offer geographically distributed collaborators a virtual repository for documents related to a project or a meeting. Electronic meeting support systems, such as interactive network-connected white boards and videoconferencing appliances, are available for the benefit of those who share the same room as well as those who are in remote locations.

The AMIDA Final Public Report describes the overall methodology behind the development of meeting support technologies. It reports that numerous studies confirm that meetings dominate the way people work. Namely, according to a study conducted by MCI Worldcom in 2003 a business person participates in 60 meetings per month. People meet in groups for a multitude of reasons. They interact in numerous predictable and unpredictable ways and the results of their interactions are as varied as the people who participate and the projects on which they are collaborating or communicating. Studies of business processes also reveal that approximately 80% of the "workload" associated with a project or process happens in preparation for a meeting. In other words, many people view the "live" meeting as a milestone or deadline by which they can pace and measure their productivity and that of their colleagues. Unfortunately, for many information managers, being in perpetual meetings has reduced their ability to prepare adequately for the next meeting, perpetuating a vicious and negative cycle.

However, Marc Al-Hames et al. report in "Audio-Visual Processing in Meetings: Seven Questions and Current AMI Answers", that although large parts of working days are consumed by meetings and conferences, unfortunately a lot of them are neither efficient, nor especially successful. They report a study in which people were asked to select emotion terms that they thought would be frequently experienced in a meeting. The top answer—mentioned from more than two third of the participants—was "boring"; furthermore nearly one third mentioned "annoyed" as a frequently perceived emotion.

The conclusion is that despite the plethora of electronic aids to meetings, fundamental problems in handling meetings have not been solved. In fact organising and conducting meetings in a business context involves a large number of factors.

Participation

A lack of efficiency of meetings is addressed in the article "Mood indicators on electronic meeting tools" IBM, IP.com number: IPCOM000011711D, Publication Date: Mar. 12, 2003. This article addresses the issue that the lack of direct feedback makes meetings clumsy, inefficient and often unproductive. It proposes a "mood indicator" as well as an "I want to ask a question" indicator which allow the presenter to choose an appropriate moment to pause, change track or field a question. It is argued that interrupting a presenter in full flow can be awkward; however, sometimes it is difficult to get an opportunity to ask a question or make a comment when many different people are trying to make their voices heard. In a similar vein, U.S. Pat. No. 6,966,035 suggests displaying a "murmur frame" for a participant to express a view. To increase user participation, US 2010/0087139 discloses a system for sending a selection to another computer, and US 2006/0095376 discloses a system for secure voting. Commenting, voting or selecting requires that a central authority provides the information that is to be selected or commented or voted on. Hence, these proposals still leave a central figure such as the presenter in a dominating position and the other members of the meeting are largely an audience with limited selection or voting or participation rights.

A further problem with meetings is that someone is usually late or has to leave early. With the person arriving late one has to decide if the meeting is interrupted and a summary of the proceedings so far is given. For the person leaving early (often a senior person), subsequent discussions can go missing. If there is a notes taker, this provides a personal summary of the meeting—but not an objective one.

Presents systems do not provide an optimal solution.

Legal and Security Issues

A legal requirement of a meeting is that presentations, comments and submissions need to be completely reproducible—in some circumstances, e.g. in a share holders' meeting, the events in the meeting should be subject to total recall. Computer-supported collaborative work technologies, particularly those which capture human verbal and non-verbal communications (audio and video interaction) in addition to text and graphics generated during a meeting, promise to have a long term impact on how people will prepare for and behave during and following meetings. In addition, connecting to a network brings the danger of virus, malware or spyware transfer in either direction, and there is danger of copying of confidential information.

Practical Difficulties

Scalability and Ease of Use

There are even more fundamental problems with using electronic tools in meetings. If two persons want to make two presentations then usually either both presentations must be placed on one machine or there is a need to swap between the presenters' machines. To bring the display content of a computer to a projector, the most common ways are to use a cable that connects the display adapter of the graphics card to the video input of the projector [method 1] or to use a software that captures the display contents and sends it over a wired or wireless network to a remote base unit connected to the projector [method 2]. This is often called "remote desktop" and is mostly used for remote administration or remote IT assistance purposes.

Less common but also practiced methods are to use a special device connected to the display adapter of the graphics card, that captures, encodes and streams the display content over a wired or wireless network [method 3].

Method 1 has several practical problems and disadvantages. In meetings where people want to contribute content from their own computers, e.g. to project images on a display, typically a video cable such as a VGA cable is used to connect each PC one at a time to the projector. This is not only not scalable but also can be and often is quite a cumbersome process that typically wastes valuable meeting time and takes the dynamism out of the meeting. Connection can be made more difficult and time consuming for example if the computer has to be rebooted for it to detect the projector or when the format of the PC differs from the format of the projector. In addition changing format can leave the computer with a new format that is not compatible with its own screen so that on reboot of the PC alone, nothing is displayed on the computer screen. Without a visible screen image the necessary re-configuration can be difficult. These issues are aggravated by a number of elements:

The use of many different video adapters, such as VGA, DVI, DP, HDMI, . . . .

Reach depends on cable length: too long leaves a tangled cable "salad" in the meeting room, too short reduces flexibility, often necessitating people to move around in the meeting room when they want to present something.

Cable connection is either point to point or requires tedious and extensive cabling and the use of complex and expensive video switches.

It is often difficult and time consuming to find the right display resolution and refresh rate that both the computer and the display or projector support.

Method 2 also has many drawbacks. If the connection is made to a corporate LAN there is a danger of virus, malware or spyware transfer in either direction, there is danger of copying of confidential information, and there is the difficulty of making the connection, e.g. entry of a user code and password, as well the administration of such passwords and user codes.

The advantage of method 3 is that the computer does not need to use its own processing power to bring the display content in a form that is easily transported over a network. This advantage becomes less relevant as computers grow in processing power. A drawback of method 3 is that the same problems often encountered with method 1 of connecting to the display adapter remain. Another drawback is that the special device referred to requires significant processing power, which means that this device will consume much power, be relatively big and certainly be relatively expensive.

An alternative method in the making today is to use the well known USB interface of the computer for extracting the display content of the computer. US 2009/0198839 discloses such a pluggable cable arrangement. US 2011/0115689 discloses a similar USB solution for wireless connection to a projector. Accordingly connecting a projector to a computer using the standard USB port might become commonplace with time. However, this usually requires special drivers and even special hardware. Connecting a projector to a computer using the standard USB port hence might become commonplace—but even when that happens there will be a mix of new and legacy machines for several years.

Firewalls

Additional problems can occur with firewalls. Typically a visitor to a meeting will bring a computer such as a laptop that is set up for a different corporate networking environment and hence has different or incompatible networking settings. The setting up of a firewall can be complicated and if this is not done correctly, telecommunication software that has to pass through a firewall may be blocked. In order to solve problems associated with firewalls it may be necessary to open ports or identify or even add programs in an exception list. If, besides a network (hardware) firewall and an operating system firewall, there is any software based third-party firewall like Zonealarm, CA Internet Security Suite or McAfee Firewall, then it is necessary to follow that software developer's documentation to place programs on a safe list or adding exceptions to the firewall rules. Such activity is beyond the usual user. Fussing with computer settings, or having to call for IT support wastes valuable meeting time and takes the dynamism out of the meeting.

Conclusion

The following problems remain for holding a face-to-face meeting using advanced electronic tools at the present time:

Complexity of the networking infrastructure.

High demands on technical expertise of users in current systems that are supposed to be designed to support everyday use by the non-expert user.

Barriers to the use of complicated technology in meetings.

Great variety of possible collaborative software solutions—none of which seems to solve the fundamental problems of holding successful meetings.

Meetings being boring or annoying for members of the meeting.

Complexity of firewalls and other security measures employed in corporate networks.

Lack of, or restriction of participation by members of a meeting.

Time taken to prepare presentations for meetings.

Need to record events in the proper time sequence at meetings without burdening a meeting more than necessary.

Although some tools solve some of these problems effectively, no electronic meeting tool solves all of them.

SUMMARY OF THE INVENTION

An object of the present invention is to provide network solutions including electronic tools for meetings as well as devices for providing connection to a communications network, to methods of operating the network, methods of displaying media content as well as software for performing any of these methods or for implementing such systems.

In an aspect of the present invention a method for displaying arbitrary media content obtained from a processing device (e.g. a digital processing device) on a display device is provided, the media content being transmitted through a communications network, the processing device having a memory and a display, the method comprising:

use of a peripheral device to provide a token that inherently or discretely provides authentication to display content on the display device and provides a link to the display device.

In particular the present invention provides a method for displaying arbitrary media content obtained from a processing device (e.g. a digital processing device) on a display device in a meeting with a plurality of participants, the media content being transmitted through a shared resource communications network, the processing device having a memory and a display, the method comprising:

use of a peripheral device to provide a token that when transferred to the communications network inherently or discretely provides authentication or permission to display the arbitrary media content on the display device, the token also providing a link to the display device;

routing the arbitrary media content through the communications network from the processing device;

obtaining unilateral electronic access to the display device; and displaying the arbitrary media content.

The arbitrary media content is preferably obtained by screen scraping data from the processing device.

In a further aspect the present invention provides a method for displaying arbitrary media content obtained from a processing device on a display device in a meeting with a plurality of participants, the media content being transmitted through a shared resource communications network, the processing device having a memory and a display, the method comprising:

use of a peripheral device to provide a token that when transferred to the communications network inherently or discretely provides authentication or permission to display the arbitrary media content on the display device, the token also providing a link to the display device;

obtaining the arbitrary media content by screen scraping data from the processing device;

routing the screen scraped arbitrary media content through the communications network from the processing device;

obtaining electronic access to the display device; and displaying the arbitrary media content.

Obtaining user selected arbitrary media content is preferably not obtained by application sharing but by the process of screen scrapping. Although software packages that provide screen scraping require installation on the target device, or at least require the installation of dedicated and/or custom drivers, embodiments of the present invention use software loaded onto the peripheral device which allows screen scraping when run on the processing device but leaves a zero footprint when terminated. Embodiments of the present invention can screen scrape full HD videos at 20 fps without requiring any installation of a program on the processing device nor requiring configuring the processing device such as a PC that they run on for the connectivity to the network hence meeting "zero footprint" requirements.

On the peripheral device a mass storage device is provided that stores the software to be run on the processing device. The mass storage device can be logically closed once the software has been read and loaded and is running from RAM in the processing device. Also provided on the peripheral device is a further device such as an HID (human interface device) to capture user input and provide user feedback. In embodiments of the present invention, the peripheral device contains multiple internal logical devices that are combined:

An HID (human interface device) used for capturing user input (e.g. following a user action such as pressing or activating a button) and providing user feedback, e.g. by an optical indicator such as a light ring around the button e.g. an LED ring, and for streaming the screen scraped video content to the network and hence to a base unit and a display, A mass storage device used to store the application, and optionally An audio device that acts as a virtual sound card to a client PC over USB, using a generic driver such as a UAC1 or UAC2 device driver.

Screen scraping is able to capture all material in a neutral manner rather than being limited by proprietary applications. Further the screen scraper application is zero footprint on termination rather than being fully installed on the processing device. Embodiments of the present invention can provide arbitrary "full content" to the meeting room and participants can display in real-time, The real-time content is shown on a central display rather than being broadcast to individual participants or archived.

Embodiments of the present invention "auto compose" arbitrary user data on a central display or screen so that full real-time content that is provided by multiple meeting participants who intentionally share this content in order to make the meeting more effective and efficient, Embodiments of the present invention implement a principle of "democratic screen sharing", in which the meeting participants decide themselves on a peer-to-peer basis which content to share when and where. Peer-to-peer data sharing differs from systems in which the content to be displayed is determined by a presenter or meeting director. The user determines where his content is routed to and can do so without any software configuration on the user processing device.

In yet a further aspect the present invention provides an electronic meeting tool for communicating arbitrary media content from users at a meeting comprising:

a node configuration means adapted to operate a display node of a communications network, the display node being coupled to a first display, the node configuration means being adapted to receive user selected arbitrary media content and to control display of the user selected arbitrary media content on the first display; and at least one peripheral device adapted to communicate the user selected arbitrary media content via the communications network, wherein the peripheral device is a connection unit comprising:

(a) a connector adapted to couple to a port of a processing device having a second display, a memory and an operating system; and (b) a transmitter for communicating with the communications network, a program adapted to be loaded onto the processing device and to run on the operating system of the processing device, said program being adapted to obtain user selected arbitrary media content, said program leaving a zero footprint on termination, and an input device to allow the user to carry out a user action that triggers transfer of said user selected arbitrary media content to said transmitter through said port.

The program can be stored on the peripheral device. The transmitter can be a wireless transmitter or transceiver. The peripheral device can be a plug-and-play device. The program cane adapted to screen scrape content of the second display.

The input device can be physical actuator coupled to the peripheral device. The physical actuator preferably has a surface area of between 100 and 14,400 square mm. Alternatively, the input device can be a key displayed on the second display. The key displayed on the second display can be one not screen scraped by the program.

In another aspect the present invention provides a method for connecting a processing device to a communications network, the processing device having a memory, a display and an operating system with at least one pre-installed generic driver providing a generic communications protocol for communication between processing device and a standard class of peripheral devices, the method comprising the steps of:

a) coupling a peripheral device to the processing device, the peripheral device having a transceiver;

b) setting up, by means of the pre-installed generic driver of the operating system, a means for communication between the peripheral device and the processing device;

c) coupling the processing device to a communications network via the peripheral device;

d) routing screen scraped data between the processing device and the communication network via the means for communication, wherein the generic communication protocol is used for transferring the screen scraped data between the processing device and the peripheral device.

The routing of the screen scraped data can be to a defined network node such as a display node without user entry of configuration details. Thus the routing can be dedicated to a specific network node such as a display node, base station etc. This is achieved by pairing of the peripheral device to the relevant node before the communication starts.

In accordance with embodiments of the present invention users start an application from the peripheral device such as a USB dongle, thus making the connection in a 3 step process: (1) connect, e.g. plug in the peripheral device to the processing device, (2) start the screen scraping application, (3) perform a user action such as click on a button on the peripheral device to allow content to be displayed on the central screen or display. To achieve step 2 Autorun or AutoPlay can be used with some Windows operating systems, but there are many different variants based on the OS version and which patches have been installed. Furthermore, this mechanism is generally considered a security hazard, which is why most IT departments will disable Autorun/Autoplay. Other OS providers have disabled this function, e.g. Apple removed a similar functionality entirely from its OS/X since Snow Leopard.

In an embodiment of the present invention a very small service—also called daemon on some OS's—is provided that requires installation on the processing device such as a laptop. This service is pre-installed on the processing device. The installation is required only once on every processing device such as a laptop. The role of this is to provide a permanently running service which continuously monitors if a peripheral device according to the present invention has been offered up for connection to the processing device. When such a peripheral device is connected, the service will detect this and start the client application software residing in the mass storage area of the peripheral device. Once the service is installed, connectivity with the peripheral device becomes a 2 step process: connect, e.g. plug in the peripheral device to the processing device, (2) perform a user action such as click on a button on the peripheral device to go allow content to be displayed on the central screen or display. The application loaded from the processing device still leaves a zero footprint on termination Step b) can comprise presenting the peripheral device to the processing device as a human interface device and wherein the pre-installed generic driver is a human interface device driver.

Alternatively or additionally step b) can comprise presenting the peripheral device to the processing device as a mass storage device and wherein the pre-installed generic driver is a mass storage device driver.

Alternatively or additionally, step b) comprises presenting the peripheral device to the processing device as a composite device and wherein pre-installed generic drivers drive different device interfaces independently.

A client application can be stored on the peripheral device which when run on the processing device obtains the screen scraped data. Such a client application can be a portable application and leaves no footprint on termination.

In another aspect the present invention provides a peripheral device for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:

a first software code portion for setting up, by means of the pre-installed generic driver of the operating system, a means for communication between the peripheral device and the processing device;

a second software code portion for connecting the processing device to a communications network via the peripheral device, the peripheral device having a transceiver;

a third software code portion for screen scraping data from the processing device; and a fourth software code for routing screen scraped data between the processing device and the communications network over the means for communication; wherein the first software code portion is adapted to use the generic communication protocol for transferring the screen scraped data between the processing device and the peripheral device.

The first software code portion can be adapted to present the peripheral device to the processing device as a human interface device and wherein the pre-installed generic driver is a human interface device driver. The first software code portion can be adapted to present the peripheral device to the processing device as a mass storage device and wherein the pre-installed generic driver is a mass storage device driver. The first software code portion can be adapted to present the peripheral device to the processing device as a composite device and wherein pre-installed generic drivers drive different device interfaces independently.

The executable software code can comprise fifth code for providing a means for connecting to the communications network including a base node. The executable software third code can comprise sixth code for providing means for capturing video frame buffers of the processing device.

The executable software code can comprise seventh code for providing a means for encoding, compressing and optionally encrypting the screen scraped data and sending the screen scraped data the communication network. The executable software code can comprise eighth code for providing a means for handling the peripheral device. The executable software code can comprise ninth code for providing means for initiating connection to the base node. The executable software code can comprise tenth code for receiving inputs from an input device on the peripheral device. The executable software code can comprise eleventh code for providing a means for sending state changes to the visual indicator on the peripheral device. The executable software code can comprise twelfth code for providing a means for presenting to the user a GUI. The executable software code can comprise thirteenth code for presenting a GUI for administration of the said executable software code when executed as a portable application. The executable software code can comprise fourteenth code for providing a means for displaying and activating a key on the display of the client processing device for allowing a user to input the start the transfer of data from the processing device to the base node.

In another aspect the present invention provides a peripheral device for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:
a first software code portion for setting up, by means of the pre-installed generic driver of the operating system, a means for communication between the peripheral device and the processing device;
a second software code portion for connecting the processing device to a communications network via the peripheral device, the peripheral device having a transceiver; and
a third processing software code for routing data between the processing device and the communications network over the means for communication; wherein the first software code portion is adapted to use the generic communication protocol for transferring the data between the processing device and the peripheral device, and an input device coupled to the peripheral device, the input device being adapted to react to a user action to trigger the transfer of the data from the processing device to the peripheral device.

The first software code portion can be adapted to present the peripheral device to the processing device as a human interface device and wherein the pre-installed generic driver is a human interface device driver. The first software code portion can be adapted to present the peripheral device to the processing device as a mass storage device and wherein the pre-installed generic driver is a mass storage device driver. The first software code portion can be adapted to present the peripheral device to the processing device as a composite device and wherein pre-installed generic drivers drive different device interfaces independently.

The input device is preferably a physical actuator coupled to the peripheral device. The physical actuator preferably has a surface area of between 100 and 14,400 square mm. The input device can be for example a key for display on the display. The executable software code can comprise fourth code for providing a means for connecting to the communications network including a base node. The executable software code can comprise fifth code for providing a means for capturing video frame buffers of the processing device. The executable software code can comprise sixth code for providing a means for encoding, compressing and optionally encrypting the video frames and sending them over a secure link to the base node. The executable software code can comprise seventh code for providing a means for handling the peripheral device. The executable software code can comprise eighth code for providing a means for initiating connection to the base node. The executable software code can comprises ninth code for receive inputs from an input device on the peripheral device. The executable software code can comprise tenth code for providing a means for sending state changes to the visual indicator on the peripheral device. The executable software code can comprise eleventh code for providing a means for presenting the user a GUI. The executable software code can comprise twelfth code for presenting GUI for administration of the executable software code when executed as a portable application. The executable software code can comprise thirteenth code for providing a means for displaying and activating a key on the display of the processing device for allowing a user input to start the transfer of data from the processing device to the base node.

In another aspect of the invention a peripheral device is provided for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:
a first software code portion for setting up, by means of the pre-installed generic driver of the operating system, a means for communication between the peripheral device and the processing device;
a second software code portion for connecting the processing device to a communications network via the peripheral device, the peripheral device having a transceiver;
a third software code portion for receiving media content from the network and for displaying the media content on the display in accordance with a set of rules; wherein the first software code portion is adapted to use the generic communication protocol for transferring the media content between the peripheral device and the processing device.

The executable software code can comprise fourth code for providing a means for correctly configuring a receiver as an access point. The executable software code can comprise fifth code for providing a means for listening for output of connection units trying to connect on a specific port. The executable software code can comprise sixth code for providing a means for a GUI for administration purposes. The executable software code can comprise seventh code for providing a means for publishing its presence over the network using the zeroconf protocol. The executable software code can comprise eighth code for providing a means for accepting and installing software updates. The executable software code can comprise ninth code for providing a means for providing facilities for pairing of connection units to the processing device. The executable software code can comprise tenth code for providing a means for auto-composing of different incoming arbitrary media streams and rendering of composited image on display. The executable software code can comprise eleventh code for providing a means for receiving, decrypting and decoding incoming arbitrary media content. The executable software code can comprise twelfth code for scaling of incoming arbitrary media streams. The executable software code can comprise thirteenth code for providing a means for displaying incoming arbitrary media content in accordance with a set of rules.

The present invention also provides a method for communicating arbitrary media content from users at a meeting comprising:
operating a display node of a communications network, the display node being coupled to a first display, to receive user selected arbitrary media content and to control display of the user selected arbitrary media content on the first display; and
connecting a peripheral device to a port of a processing device and communicating the user selected arbitrary media content via the communications network,
loading a program onto the processing device and running the program on the operating system of the processing device to obtain user selected arbitrary media content, said program leaving a zero footprint on termination, and triggering transfer of said user selected arbitrary media content to said transmitter through said port after a user action on an input device.

The present invention also provides a peripheral device comprising:
a base
a connector for connection to a plug and play port of a host processing device,
a flexible connection between the base and the connector for transferring data signals and power,
an actuator on the base for actuating a signal and for transferring the signal to the connector for transfer to the port, wherein the base has electronics comprising permanent storage for storing a portable application, a processing engine, a transceiver and a visual indicator.

The present invention also provides a method for providing communication connectivity from a processing device, setting up a communications network between a base node of the communications network and a peripheral device coupled to the processing device;
transferring media content between the processing device and the peripheral device, transmitting the media content from the peripheral device to the communications network, receiving media content from the communications network at the base node and displaying the media content on a display in accordance with a set of rules.

Any of the above software code stored on a non-transitory storage medium.

DEFINITIONS

"unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting.

"Plug and play" is a term used to describe the characteristic of a computer bus, or device specification, which facilitates the discovery of a hardware component in a system, without the need for physical device configuration, or user intervention in resolving resource conflicts. Plug and play devices can be added to a bus of a computing system (while running or when shut down), and the newly added device and possibly the rest of the computing system is automatically configured to make the newly added device work, both from hardware and from software perspective.

Plug and play interfaces include for example (not an exhaustive list): Firewire (IEEE-1394), PCI, Mini PCI, PCI Express, Mini PCI Express, PCMCIA, PC Card, Universal Serial Bus (USB), SDIO cards.

"Auto-configuration" is the automatic configuration of devices without manual intervention, without setting any switches or jumpers, and without any need for software configuration. An example of auto-configuring devices: USB devices. Examples of auto-configuring protocols: DHCP, Zeroconf, Bonjour.

A plug and play device has auto-configuration software by default to make it plug and play. Example: USB devices are made to be plug and play by including the correct auto-configuration software (e.g. host driver, host stack, application software). Auto configuration can also refer to a software alone and is not restricted to a physical device.

"Hot swapping and hot plugging" are terms used to describe the functions of replacing computer system components without shutting down the system. More specifically, hot swapping describes replacing components without significant interruption to the system, while hot plugging describes the addition of components that would expand the system without significant interruption to the operation of the system. A well-known example of this functionality is the Universal Serial Bus (USB) that allows users to add or remove peripheral components such as a mouse, keyboard, or printer. Other examples are eSATA, PCIe, FireWire, for example.

A "portable application" (portable app), sometimes also called standalone, is a computer software program designed to run without installation on the target machine. This type of application is stored on a removable storage device such as a CD, USB flash drive, flash card, or floppy disk—storing its program files, configuration information and data on the storage medium alone. It is a program that can be stored on an electronic device such as a USB flash drive, iPod, memory card, portable hard drive or other portable electronic device and runs on a computer or other processing device coupled to the electronic device without making permanent configuration changes to the host computer. All such programs have a zero-footprint, meaning all temporary files, registry entries, and any other changes to the machine exist only while the program is running To be considered a portable application, for purpose of this invention, a software program must:
Not require any kind of formal installation onto a computer's permanent storage device to be executed, and can be stored on a removable storage device such as USB flash drive, iPod, memory card, portable hard drive or other portable electronic storage device thus enabling it to be used on multiple computers.
Settings are stored with, and can be preferably carried around with, the software (i.e., they are written to the electronic device such as a USB drive). Settings are not stored to the registry or any other central system database of the computer.
Leaves a zero (or near-zero) "footprint" on any PC it is run on after being used. i.e., all temporary files/registry settings should be either avoided or at least removed once the program has exited, and files created by the user can be saved directly to the same removable media as the application is stored on.

A portable application does not leave its files or settings on the host computer on which it runs. For example, the application does not write to the Windows registry or store its configuration files (such as an INI file) in the user's profile; instead, it stores its configuration files in the program's directory. Another requirement, since file paths will often differ on changing computers due to variation in Windows drive letter assignments, is the need for applications to store them in a relative format. Preferably, such a program does not require a launcher program to copy necessary settings and files to the host computer when the application starts and move them back to the application's directory when it closes as this may leave a residue on the hard drive in case of power failure.

"Electronic meeting systems" (EMS) need to be distinguished on the one hand from classic groupware, on the other from web conferencing systems. In reality, there is some overlap between minor features of products of the named categories. The main difference from groupware is the intensity of collaboration. EMS should be distinguished from systems with which it is possible to show the contents of an individual computer screen on a remote display with multiple users at the same time.

"Groupware" supports collaboration within groups where the individual contributions remain identifiable. In contrast, EMS enable the group to cooperatively produce a result for which the group is responsible as a whole. In a business process, groupware and electronic meeting systems complement each other: Groupware supports teams when researching and creating documents in the run up to an EMS session or when implementing the results of such a session.

"Web conferencing systems" and "electronic meeting systems" complement each other in the online meeting or workshop: EMS extends the web conferencing system by providing interactive tools for producing and documenting group results. On the other hand, "web conferencing systems" complement EMS with the screen sharing and voice conferencing functionality required in synchronous online meetings and not present in EMS.

"Data conferencing" refers to a communication session among two or more participants sharing computer data in real time. Interaction and presentation devices such as a screen, keyboard, mouse, camera, etc. can be shared. It is a term used to distinguish from video conferencing and audio conferencing. The data can include screen, documents, graphics, drawings and applications that can be seen by the participants of the meeting.

"Application sharing" is an element of remote access, falling under the collaborative software umbrella, that enables two or more users to access a shared application or document from their respective computers simultaneously in real time. Generally, the shared application or document will be running on a host computer, and remote access to the shared content will be provided to other users by the host user. Application sharing should be distinguished from systems in which collaboration on the applications between different users is not possible but the contents of individual computer screens can be projected onto a remote display with multiple users at the same time.

The term "arbitrary media content" refers to the fact that a user may generate, create or select any media content that is appropriate to display. This differs from client voting on, or selecting of media content that is displayed by another in a meeting or presentation. This term refers to client oriented, distributed rights and privileges for the display of content rather than a central presenter providing content which is presented to the members of the meeting.

"Screen scraping" in our sense refers to reading the video frame buffers and processing them, rather than just rendering them on a display. Screen scraping for presentations is described in US2002/0196378 to Slobodin et al which is included herein by reference.

"Auto composition" or "auto layout" refers to the automatic nature in which multiple graphics/video sources are rendered on a central display, without user intervention and in a way that a user would intuitively expect it to happen.

"Wireless" and "wireless communication network" can be any network that does not use cable links between nodes, e.g. uses RF, optical or InfraRed for communication purposes, such as IrDA, diffuse infra-red, WLAN, WiMax, WiFi, WiFi Direct, Bluetooth or any other wireless communication network known to the person skilled in the art.

"Computer" generally refers to a processing device, i.e. having a processing engine capable of various types of digital processing, such as rendering graphics images for display. A computer can be in the form of a work station, a personal computer, a laptop, a palm top, a PDA, a smart-phone, a tablet etc. Generally a computer has memory such as volatile RAM. Non-volatile memory such as a hard disc, optical disk or solid state memory can be included in the computer or can be a peripheral device. Currently most computers are electronic but the term "computer" also include optics based computing devices.

The term "pre-installed generic driver" is intended to mean a driver which is installed on a processing device such as a computer as a standard driver, e.g. is installed with the installation of the operating system. Such a driver is standard for the operating system and can drive a standard class of peripheral devices coupled to or connected to the processing device. The installation of a specific driver for such a peripheral device is not required. Such a generic driver can be a human interface driver (HID) or a mass storage device driver, which has predetermined software components configured for driving mass storage, a CD-ROM, a keyboard etc. or combinations of these. Such devices can be readable and writable computer peripheral memory devices such as USB memory sticks, flash memories, external hard drives, or more.

BRIEF DESCRIPTIONS OF THE DRAWINGS

DETAILED DESCRIPTION OF THE INVENTION

Figure 1A:
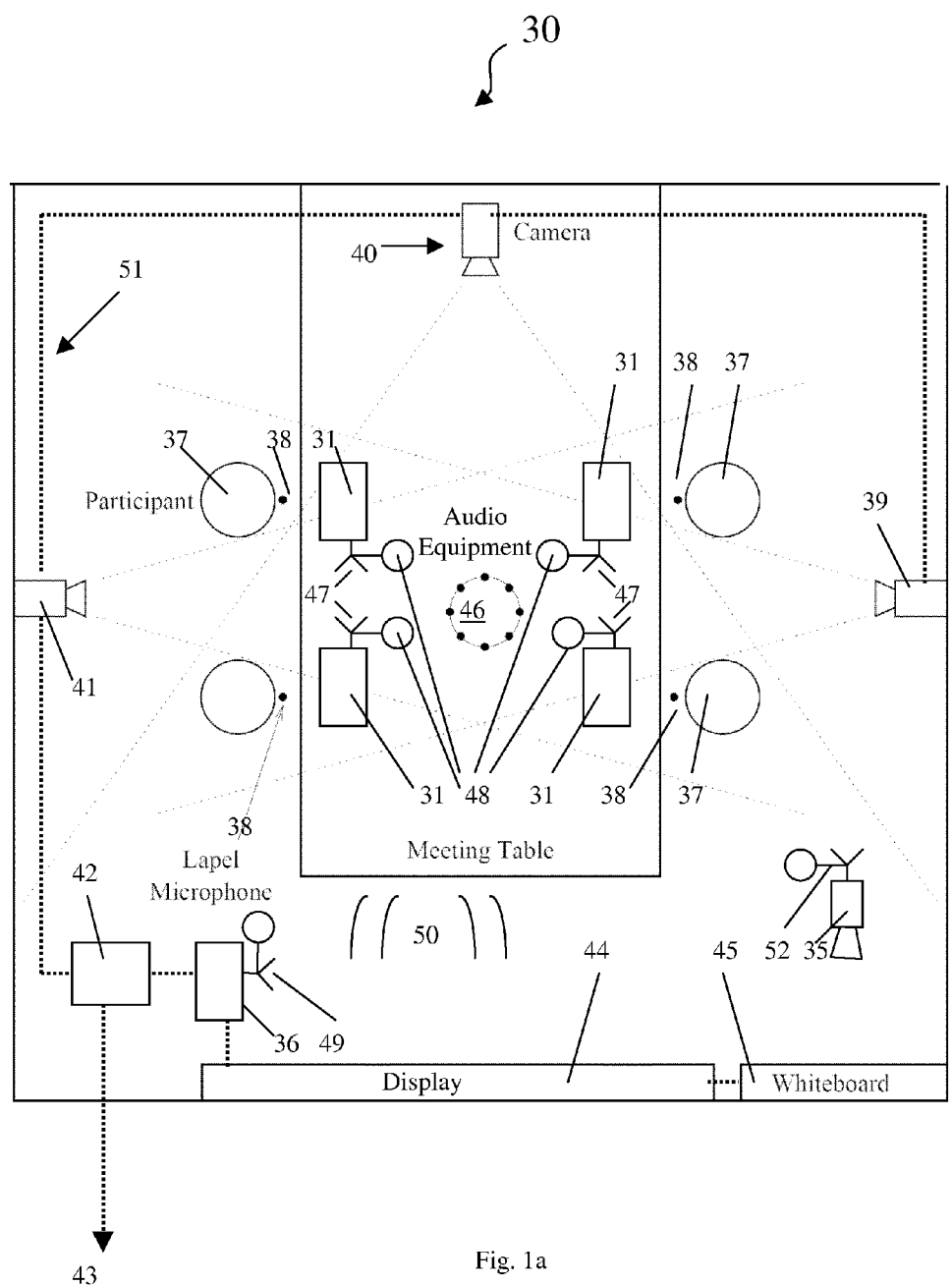
FIG. 1a shows a meeting room that can be used with embodiments of the present invention.

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

Embodiments of the present invention provide solutions to three major problems with meetings:
a) the time taken to prepare for a meeting. This is mainly achieved by allowing "on-the-fly" presentation of any displayable information. This information does not have to be linked into any particular presentation software, nor to be compatible with any such presentation software,
b) the time taken to conduct the meeting using electronic meeting tools. This is achieved by reducing the time to connect computers to the display or projection system.
c) the time taken to reflect and review and document the meeting afterwards. This is achieved by providing the possibility of recording the course of the meeting in the same time sequence that it was carried out as well as be able to store all data presented and who presented it.

Meetings in which visual information is presented on a display or projector commonly suffer from a monopoly effect: one single presenter determines the display contents and thereby has a disproportionate power to influence the meeting dynamics and thereby its outcome. Systems are known that allow multiple individuals to simultaneously show their information.

Separately, most meetings are initiated by some sort of invitation system (Outlook, WebEx, GoToMeeting etc.) which is external to the meeting room system (typically via email) and thereby confusing and inflexible.

While the above issues may not present obstacles in highly structured and expertly managed gatherings such as board meetings, they do cause confusion and frequent delays to more ad-hoc meetings especially those without structured agenda's and attendee lists.

FIG. 1a is a schematic representation of a generic meeting room 30 with a meeting table that can be used with embodiments of the present invention. Participants 37 having some form of processing device 31 such as a laptop computer, a tablet, a PDA etc. Each of the processing devices 31 can be a host device and has a first connection unit 47 to which it is coupled. The first connection unit 47 provides access to a network 50 which in this case is a wireless network, but could be a wired network. The network is a shared resources communications network as different devices and participants can transmit data over the network. Each connection unit 47 may be coupled to an input device 48 which will be described in more detail later. A user 37 will typically at a distance from the processing device 37 which is ergonomically satisfactory. This ergonomic boundary is typically an area of about 1000 sq cm to 4000 sq cm. This ergonomic boundary will typically have the user as one side of the boundary and the comfortable reach of the arms will determine an area on the left and right of the processing device which falls within the ergonomic boundary and the far edge of the boundary of the processing device (normally delimited by a display screen) will determine the other side of the ergonomic boundary. The area defined by the ergonomic boundary will overlap or include the processing device 31 itself. The processing device will also have an outer physical boundary. The input device 48 is preferably arranged to operate outside the boundary of the processing device 31 but within the ergonomic boundary. Preferably the input device is arranged to function when it is flat on the table. The input device preferably has a size of activation area of between 1 and 144 square cm.

Preferably the network 50 is a local area network, i.e. and shared resources communication network and preferably local to the meeting room for security reasons but the network 50 may have access to other local or wide area networks such as 51 or to a larger corporate network or the internet 43, for example via a router 42. Another node of the network 50 is the base or display node 36. This node 36 may optionally be a wireless access point. The base node 36 may also be a processing device or host computer and may be coupled to a second connection unit 49 that provides access to the network 50 thus linking all of the processing devices 31, 36 together. The connection unit may have an input device as described above. Alternatively, network connections installed on the base node 36 can be used. Audio equipment 46 may be provided, e.g. a telephone that allows other members of the meeting to call in from remote destinations.

The display node 36 is coupled to and adapted to allow display of media on some kind of display 44. The display node is in embodiments of the present invention a base node of the communications network 50. The display 44 may be a projector and screen, the projector being coupled to the base node 36. A whiteboard 45 can optionally be provided that can be optionally coupled to the display 44 and/or the base node 36, e.g. when the whiteboard can record electronically what is written on it. Optionally, a camera 35 may be provided to record the entries on the whiteboard 45. The camera 35 may have a third connection unit 52 for connecting the camera 35 to the network 50 so that the data from the whiteboard can be recorded and stored or transmitted to other networks via router 42. The connection unit 52 may have an input device as described above with respect to connection unit 47.

Optional equipment can be cameras 39, 40, 41 for recording the progress of the meeting. These cameras can be linked by a network 51, e.g. a cable network to the router 42 and/or the base node 36. Another optional item is a microphone or microphones 38 that can be used to transfer audio, e.g. to the processing devices 31 and to loud speakers (not shown) attached to the base node 36 or part of the display 44.

Any or all of the outputs of the processing devices 31, the cameras, the whiteboard, etc. can be recorded and stored digitally, e.g. in node 36 or elsewhere to provide a complete record with correct time sequence.

Summarising the above, the present invention provides an electronic meeting tool for communicating arbitrary media content between different users 37 (with their own processing devices 31, e.g. PC, mobile phone, or tablet) and one display or projector or multiple displays or projectors 44 in the meeting room 30.

Figure 1B:
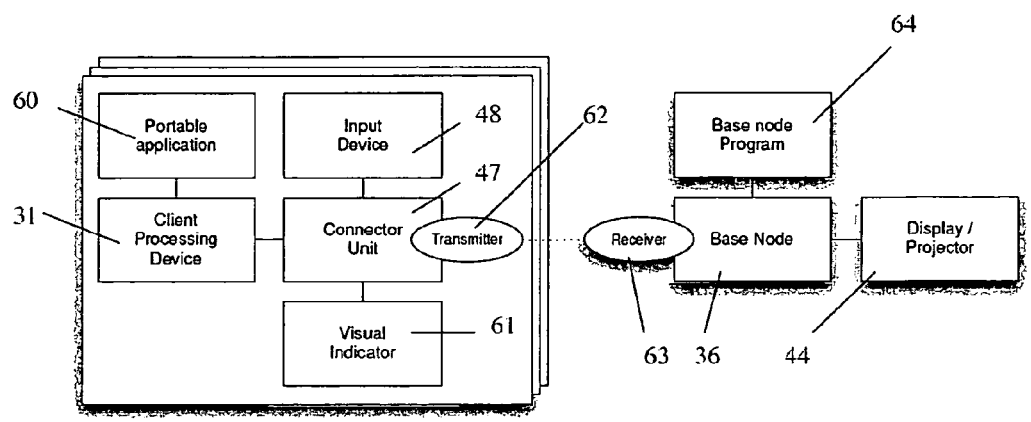
FIG. 1b shows a combination of a client processing device, a connection unit, a base node and a display in accordance with an embodiment of the present invention.

Referring to FIGS. 1a and 1b embodiments of the present invention comprise a base or display node 36 being a processing device, e.g. a host computer adapted to receive user selected arbitrary media content, the base node 36 being coupled to a central display 44 which can be a fixed format display or a projector or similar. The arbitrary media content can be provided from any of the user processing devices 31. The base node 36 can be adapted to display the received user selected arbitrary media content in accordance with a set of rules, e.g. FIFO, automatically, on request or approval, forced to display, in accordance with a priority etc. Optionally the base node 36 is adapted to force display of the received user selected arbitrary media content, i.e. to allow participation in the meeting by an individual user displaying own selected content on display 44 independently of the person who is nominally responsible for giving a presentation or chairing the meeting. Forcing the display can also be considered as a rule. The phrase "unilateral electronic access to the display device" defines this kind of rule as "unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting. The meeting tool can also be adapted to allow a priority setting. This means that a user can set a priority setting for the media to be displayed. A priority of "1" for example can be interpreted by the base node as a forced display, a priority "2" can be interpreted by the base node as display as soon as possible, priority "3" can be interpreted by the base node as place in queue and display as the time comes etc. Setting and using priorities for display are also considered to be working to rules. To execute the rules, the base node 36 may have a decision module. The base node 36 may be a host computer having a processing engine such as a microprocessor and a memory. Preferably, the base node 36 is adapted to treat media content passed to the base node 36 from any or all of the connection units 47 in an equal manner. The base node 36 may be adapted to auto compose the media content on the central display 44 connected to it, e.g. from one or more processing devices 31.

An independent aspect of the present invention is at least one connection unit 47, (optionally 49 for receiving or unit 52) adapted to communicate the user selected arbitrary media content to said base node 36. Preferably the connection units 47 and/or optionally 49 or 52 are physical plug-and-play devices. An example of a connection unit is shown schematically in FIG. 10.

The connection unit 47 may be integrated into a user processing device 31, e.g. as an internal peripheral device or may preferably be an external peripheral device comprising a connector adapted to couple to a port of a user processing device 31. The processing device 31 may have a client display, a processing engine such as a microprocessor, a memory and an operating system. The optional connection unit 49 may integrated into the base node 36, e.g. as an internal peripheral device or may be an external peripheral device comprising a connector adapted to couple to a port of the base node 36. The connection unit 49 may be fully integrated into the base node 36, e.g. is an internal network interface of the base node 36. The base node 36 may have a processing engine such as a microprocessor, a memory and an operating system.

The user processing devices 31, the connection units 47, (optionally 49 or 52) and the base node 36 co-operate to form a communication network 50 for linking between at least one of the plurality of processing devices 31, 36 and the central display device 44. The communication network 50 is adapted to receive arbitrary media content from at least one of the plurality of processing devices 31 and to transmit the arbitrary media content of at least one of the plurality of processing devices to the central display device 44.

An independent aspect of the present invention is a portable application 60 adapted to be loaded onto a client processing device 31 and to be run on the operating system of the client processing device 31. The portable application 60 runs as a process on the client processing device 31 that is adapted to deliver an arbitrary media content from the client processing device 31 to the communication network 50 in response to a user action applied to an input device 48, the process leaving a zero footprint on the processing device 31 on termination. The network 50 is a shared resources communications network as different devices and participants can transmit data over the network. Optionally the portable application 60 is stored on each connection unit 47 and optionally 49 or 52. Preferably the portable application 60 is adapted to "screen scrape" content of the client display of the client processing device 31. Optionally the portable application 60 when run on a processing device 31 is adapted to "screen scrape" content of the client display of this client processing device 31 and to transmit it via a connection unit 47. Optionally the portable application 60 when run on the processing device is adapted to "screen scrape" content of the client display of the client processing device 31 and to transmit it via a network interface of the processing device 31, for example if the connection unit 47 has no transmitter.

The connection unit 47 for communicating with said base node 36 has a network interface e.g. comprising a transmitter 62. The transmitter 62 is preferably a transceiver. Optionally the transmitter/receiver can be a wireless transmitter/receiver.

The base node 36 for communicating with the connection unit 47 has a receiver 63 which can be included in the connection unit 49 or integrated into the base node 36. The receiver is preferably a transceiver. Optionally the transmitter/receiver can be a wireless transmitter/receiver.

The input device 48 allows a user interaction with the connection unit 47. Preferably the input device 48 is physical actuator coupled to the connection unit 47. The user action applied to the input device 48 generates a signal that can trigger transfer of data from the processing device 31 (to which the connection unit 47 is coupled) to the network 50. Preferably the input device 48 has an activating surface that is between 100 and 14,400 square mm. Optionally, the input device 48 can be a key displayed on the client display 1 of a client processing device 31. This key can be activated, e.g. by use of a pointing device such as a mouse trigger transfer of data from the processing device 31 to the network 50.

The connection unit 47 is preferably provided with a visual indicator 61, e.g. for allowing user feedback from the connection unit 47 of the status of any activity.

The system also can include a server program 64 adapted to be loaded onto the base node 36, said program 64 being adapted to receive arbitrary media content from one or a plurality of client processing devices 31 through said connection units 47, (optionally 49), and to show this plurality of arbitrary media content streams on one or a plurality of displays 44. The server program 64 may be adapted to allow display in accordance with one or more rules, e.g. FIFO, automatically, on request, forced, in accordance with a priority etc. The forcing rule can be described as allowing "unilateral electronic access to the display device" by a participant. "Unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting. To execute the rules, the server program 64 may have a decision module.

Preferably, the server program 64 is adapted to treat media content passed to it from any or all of the connection units 47 in an equal manner. The server program 64 may be adapted to auto compose the media content on the central display 44.

The server program 64 may be a portable application adapted to be loaded onto the base node 36 and to be run on the operating system of the base node 36. The portable application 64 runs a process on the base node 36 that is adapted to display an arbitrary media content received from the client processing device 31 via the communication network 50, the process leaving a zero footprint on the base node 36 on termination. Optionally the portable application 64 is stored on each connection unit 49 and optionally 7 and can be installed therefrom.

The system may also include a central display device 44 and optionally a whiteboard 45 or other display means such as a printer. The display 44 being adapted to receive user selected arbitrary media content, and may be adapted to allow display of the received user selected arbitrary media content in accordance with one or more rules, e.g. FIFO, automatic, forced, on request or approval, in accordance with a priority etc. The forcing rule can be described as allowing "unilateral electronic access to the display device" by a participant. "Unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting.

Optionally, one of the connection units 47 can be adapted to be a master connection unit. Such a master connection unit may be adapted to instruct the base node when media content from a client processing device 31 may be displayed or which of the processing devices may be allowed to send content for display.

In embodiments of the present invention, at least one portable application is used, e.g. for the client software on a client processing device 31 or optionally on the base node 36. In these embodiments, one of the pre-installed generic drivers of the operating system on the relevant computer device 31, 36 is exploited for setting up communication from the computer device 31, 36 to the network 50 via the connection unit 47, (optionally 49 or 52). The generic driver is used in connection with the connection unit 47, (optionally 49 or 52) operating as a peripheral device but the use can go beyond that of the standard class of peripheral devices for which the generic driver is intended. In some embodiments the connection unit 47, (optionally 49 or 52) operated as a peripheral device communicates with the relevant processing device 31, 36 by using a generic communication protocol provided by the pre-installed generic driver. Pre-installed USB drivers are examples. Preferably the setting up of the communication of network 50 using connection unit 47, (optionally 49) does not alter or affect the networking capability of the relevant processing device 31, 36. For example, if a browser is started on the client processing device 31, this browser can use the standard network interfaces on the processing device 31. This means that transfer of data via the connection unit 47 (optionally 49) is independent of transfer of data over the network interfaces of processing device 31 or 36. This has the advantage that each user can carry out processing such as searching on the internet to gather data independently of the transfer of data to be displayed during a meeting, or receive emails etc.

The use of a portable application has the advantage that any modification to settings in the register or generally in the operating system can be avoided, so that upon any form of termination, e.g. disconnecting the electronic device, system crash, no trace is left. This is generally termed "zero footprint".

The present invention has the advantage of scalability. It can provide a display system for use by a plurality of users in meetings. Every user in the meeting thus can have a client processing device 31 for coupling to a connection unit 47. A first user action connects the client processing device 31 to the base node 36, e.g. by inserting a connection unit 47 into the relevant interface connector on the processing device 31, e.g. a USB interface. A second user action comprising activating a button or key on the input device (e.g. by depressing it) then starts the process of transmitting arbitrary media content from the client processing device 31 to the base node 36. This process preferably includes screen scraping data from the processing device. Using screen scraping avoids special programs being installed on the base node 36 to carry out graphical commands sent from the processing device 31. When the base node 36 receives the plurality of arbitrary media content, it can allow auto composition of this media content on the central display connected to it.

The present invention will now be described further with reference to certain more specific embodiments.

The present invention in some embodiments provides a system and/or a method to which in one aspect can override all currently displayed material when arbitrary material is presented on a display device from more than one source processing devices such as a laptop, PDA, smartphone, computer, tablet etc. The present invention in one aspect controls the display of visual communication and information by a method akin to talking, i.e. full-duplex and with the option to interrupt or to obtain unilateral electronic access to a display device.

One embodiment the present invention can be implemented through a connectable peripheral device e.g. a USB compatible device, such that when the peripheral device is connected to a processing device that is used to provide arbitrary information such as text, video, pictures etc., each individual user with a processing device can to gain access to the display, e.g. screen. By being present at the meeting a user can pair the peripheral device to a processing device by inserting the peripheral device. The user can also pair the peripheral device to a base node or base unit that controls the display in the meeting room and which is connectable to the peripheral device via a communications network such as a wired or wireless communications network. The network is a shared resources communications network as different devices and participants can transmit data over the network. To achieve this, the peripheral device has a transceiver capable of transmitting the arbitrary data from the processing device to the display via the base node. In one option the information displayed on the local display of the processing device is screen scraped and transmitted. To allow this the peripheral device can include a portable application that is able to execute on the processing device leaving a zero-footprint on termination. Although a physically connectable peripheral device is convenient, the peripheral device could also be coupled to the processing device via a wireless connection, e.g. via the Bluetooth protocol.

For meetings with remote participants it is not possible to rely on the same hardware connectable peripheral device to provide access from a remote location to the display in the meeting room directly. Typically, at home or in a hotel, the participant only has a phone and internet access on a laptop or some other kind of portable computing device. Remote participants lack context (e.g. non-verbal communications) and have less than ideal audio/video connections and consequently suffer from a power-asymmetry. Typically, remote participants also have no way of 'pushing' their contents on screen, since the meeting is controlled by a meeting organiser or director who orchestrates the sequence of presentations.

One of the key advantages of the present invention is to provide remote collaboration while maintaining a kind of 'situational awareness'. This means that what you see has a straightforward relationship with your internal mental map. This allows keeping track of multiple information flows and being able to correlate that quickly with any other information, e.g. with a search carried out on the local computing device.

In another aspect of the present invention confusion and frustration is avoided by:
1. retaining aspect ratio of any image that is sent from any location to the display in the meeting room or displays in meeting rooms (e.g. a long thing remains a long thing)
2. not overlapping images and/or windows on any of the display devices in the meeting rooms (e.g. you never have to guess or remember what's hidden)
3. showing the same arrangement of images on each screen (everyone sees the same things and can refer to them), this means that the topological arrangement of images on each screen of multiple screens is the same,
4. maximizing the use of screen real-estate (e.g. the images presented do not have borders containing no useful information), while preferably no allowing overlapping of the images
5. allowing local manipulation of zoom and pan but allowing to return to the default layout of item 3 above
6. arranging the images on each display taking into account the local display characteristics, such as any of resolution, pixel density, aspect ratio,
7. optionally also allowing an ongoing audio connection to be heard by all participants, e.g. that verbal communications will be used to alter the contents of the screen.

Components of the present invention in embodiments are preferably:

A shared (e.g. virtual, digital) canvas, on which all visual information is stored. The canvas is mapped onto one or more physical displays at one or more geographic locations and can be at least as large as the largest display. Meeting participants can add or delete visual information, e.g. local participants can use a peripheral device according to embodiments of the present invention whose operation is: one click adds the users screen to the canvas, another click removes it. Optionally, a long click replaces the current canvas contents with only the user's screen. The canvas is maintained in a location that is accessible electronically (e.g. virtual, digital)) for all meeting participants, but participants can only change the canvas if they have a "token". By using a single canvas, giving access to all participants to this canvas and broadcasting the information on the canvas to other locations, controllable and consistent amendments can be made to the canvas by any participant.

A token is at the same time a means to change information on the canvas and the right to make these changes. Tokens are a sign of trust; they are only transferred from individual persons to other individual persons. Only participants with tokens can give additional tokens to other individuals. A hardware peripheral device used locally is an example of a token. The user pairs the peripheral device with a processing device and with a base node or unit. The user is associated with the peripheral device because of the selection of it and its pairing to a processing device. This procedure inherently provides trust—the same trust as was granted to the user to be present at the meeting. In accordance with an aspect of the present invention, remote participants have the same rights as anyone else possessing a token, but a physical token is not passed remotely to a user. In one aspect, first contact between meeting participants is with voice communication. Voice communication is a good medium to transfer tokens. It is suitable for trust transfers because a. by knowing someone's phone number (either a personal cell phone number or the number of the location the user is currently at, such as a hotel or home) there is an implication of a personal connection and b. the human voice is a pretty good identification means.

The token in this embodiment is transferred by verbal instruction and needs to convey the means to make a contribution to the canvas. One way to implement the token is the combination of a URL plus a unique session ID for the meeting and implicitly one or more meeting rooms. In one aspect the combination of these two gives access to a meeting-specific website that serves two purposes: 1. optionally to download and install a screen capture software program and 2. to give access to the shared canvas. The combination of 1. and 2. offers remote participants using a portable processing such as a laptop, PDA or smartphone the same functionality as local participants. Since the verbal instruction needs to be concise, a service similar to tinyURL.com (or lilURL or TightURL) can be used to combine the website+session ID. To avoid mistakes the shortened URL will use a sub-set of characters that are easily pronounced and avoid language confusion (such as between G & J or I & E). An example is hexadecimal characters only.

An alternative method for transferring a token is the use of a messaging service such as by the Short Message Service (SMS). This is not a voice contact but it includes the same level of trust as a mobile phone number of a known person is used. If necessary to improve security the person can be contacted by phone first and only then is the SMS message sent. If required a password can be used whereby a second password can be used to indicate that the person is under duress so that the SMS message should not be sent.

A meeting session ID indicates a temporary connection between the canvas, the tokens and the screens. In one aspect a session ID is generated automatically when the first physical peripheral device is inserted in a processing device in a meeting room and makes a connection with a base node or unit. This session ID can then be made visible to each individual that owns a peripheral device. It can be implemented by a. changing the name of the mass storage device implemented by the peripheral device, or b. changing the name or the contents of a text file on the mass storage device volume on the peripheral device or c. by a display on the peripheral device if such a display is provided, or d. by display on the central display device in the meeting room. The meeting ID or media conference code makes it easy for multiple participants, who can be at different locations, to engage in a media conference.

For example, on the display of the meeting room, a numerical or alpha-numerical media conference code is displayed. In order to share content, the participants can connect their processing devices such as a laptop over the network with the meeting room by entering the media conference code on their processing device, for example either in a webpage or a dedicated software client.

The session ID performs the following functions:

Access control: Only people physically present in the meeting room are able to see the code. This ensures that only people in the room or people who received the code from someone in the room (e.g. through e-mail or telephone) can connect with the meeting room. This provides trust.

Meeting room location: The remote person entering the code is automatically connected with the right meeting room and doesn't have to bother with searching the meeting room in a list of possible meeting rooms or entering the address (IP, phone number, . . . ) of the meeting room. The participants don't even have to be aware of which meeting room they're in.

A media conference can start as soon as one person is connected to the central display. Optionally, as long as no-one is connected to the central display, the ID or media conference code changes at a certain frequency (e.g. once every minute). When a new code appears, previous codes are no longer usable. This ensures that a possible intruder cannot peek at the media conference code before the actual conference starts. The ID or code remains the same for the whole duration of the media conference. A media conference ends when the last participant disconnects. Afterwards, the ID or code will change again.

The ID provides a combination of multiple purposes (access control and meeting room location) in a single easy to use code. The products that are currently on the market require a separate meeting room location code (e.g. phone number, e-mail address, IP address, . . . ) and a separate means of controlling access to the media conference (e.g. password, manual acceptance of incoming calls by conference host . . . ). For example, to join a WebEx conference, the participants need to know both the meeting number (=location) and meeting password (=access control). A video conference device requires that remote participants know the telephone number/IP address (=location) and that a local participant accepts the incoming call (=access control).

In an embodiment, the start of a meeting session is preferably asymmetric, in that a remote participant cannot initiate a session. A meeting must start with an individual in possession of a physical peripheral device.

A session ends when all tokens (local and remote) have cut their connections with the canvas i.e. all physical peripheral devices are unplugged and all remote sessions are disconnected from the meeting website. Since it is possible for remote users to stay connected, accidentally or surreptitiously, alternative ways to end a session are: session ends when all peripheral devices are unplugged and a preset time has passed or the reset button on the meeting base station or base unit has been pushed.

A canvas is a shared memory that stores a visual bitmap that is or can be displayed on one or more displays or projectors. A canvas is a simple two-dimensional structure that is easy and cheap to implement. An alternative implementation is to store the canvas as an HTML5 page that can be rendered by a browser.

The size of the canvas (its width, height and color depth) is preferably at least the size of the largest display. This ensures that the largest display is used at its maximum capability. Canvas mapping functions optimize legibility on smaller displays.

The canvas is mapped onto a display by a transform function that optimizes its visual appearance on each particular display (e.g. interpolation, (de-)interlacing, size resampling, scaling etc). The canvas mapping function first determines the type of display that it is mapping to and then chooses resolution, frame rate, color depth and color mapping functions (gamma, brightness, contrast) for optimum legibility in a typical meeting room environment and also to maintain the topological arrangement of the images when multiple images are displayed—this means that remote participants can refer to the image consistently, e.g. "top left".

The canvas mapping conserves boundaries and aspect ratio's across displays (i.e. it does not stretch nor crop). In a typical implementation of mapping onto large fixed format display such as an LCD display or onto projector screens the canvas is preferably re-sized to fill the screen's full height or width. In an implementation for smart phones this same approach is used but the end-user can zoom-in on details e.g. by pinching/stretching.

Multiple contributors can modify rectangular, non-overlapping sections of the canvas. By restricting the layout to simple rectangular sections it is possible to draw attention to particular contents by verbally referring to its position on the screen ("look at the top-left picture"). Canvas sections can be labeled by an identification of their contributors (such as user or computer names).

The size and position of a contribution to the canvas is under control of an automated algorithm. The algorithm is a simple rule, such as: 1. the first contribution fills the whole canvas, 2. the second contributions splits the screen horizontally into two equal sections, with the first contribution displayed on the left, 3. the third contribution splits the canvas vertically with the first two contributions on top, etc. The simplicity of this rule, and the absence of direct contributor influence on the algorithmic positioning, allows meeting participants to predict where contents will be displayed thereby minimizing confusion amongst (remote) participants.

One implementation of a canvas is memory stored on one physical location with (remote) access functions to update and map its contents. Local caching combined with dirty-tiling or region-of-interest coding techniques can be used to minimize communication payload. Alternatively a web-based technique can be used as in www.shared-canvas.org.

One implementation of the canvas is a logical description of the canvas layout and all it's components in a XML, HTML or similar format, where the physical instantiation of the canvas only takes place at the participating endpoints in a session. Maintaining the canvas content and/or the canvas definition, the session ids, the tokens, the relationships between the tokens and the sessions can be offered as an external service to the users of the solution.

Figure 13:
FIGS. 13 to 15 show use of a QR code in accordance with an embodiment of the present invention for remote access.

An alternative method for transferring a token is a visual code that can be picked up by a camera, such as a web camera or a camera in smart phones and tablets. The token can be in the form of a code such as a 2D barcode. Such a code is a "QR" code—see FIGS. 13 to 15. The code can be displayed on a display of a processing device such as a computer, laptop etc.

The QR (FIG. 13) functions as a secret code that is convenient to use for the combination of an electronic screens and smart phones. The secret (i.e. the contents of the QR code) information in the code is which screen belongs to which meeting.

So, a local meeting room base station knows which screen it is connected to. It does not know which meeting it belongs too. A mechanism can be provided like the first time a physical peripheral device is inserted in a local processing device, optionally after a suitable time-out period (see above) to initiate a meeting and thereby make an association between a central display and a meeting. Then a QR code can be generated. The QR code contains a meeting ID and a URL to access the central display (in preferred embodiments indirectly via a shared canvas)

This QR code is displayed and can be picked up by any meeting participant. These participants then do not need a peripheral device, but can use the resources listed in the QR code to connect to an online canvas on which they can display their data.

Figure 14:
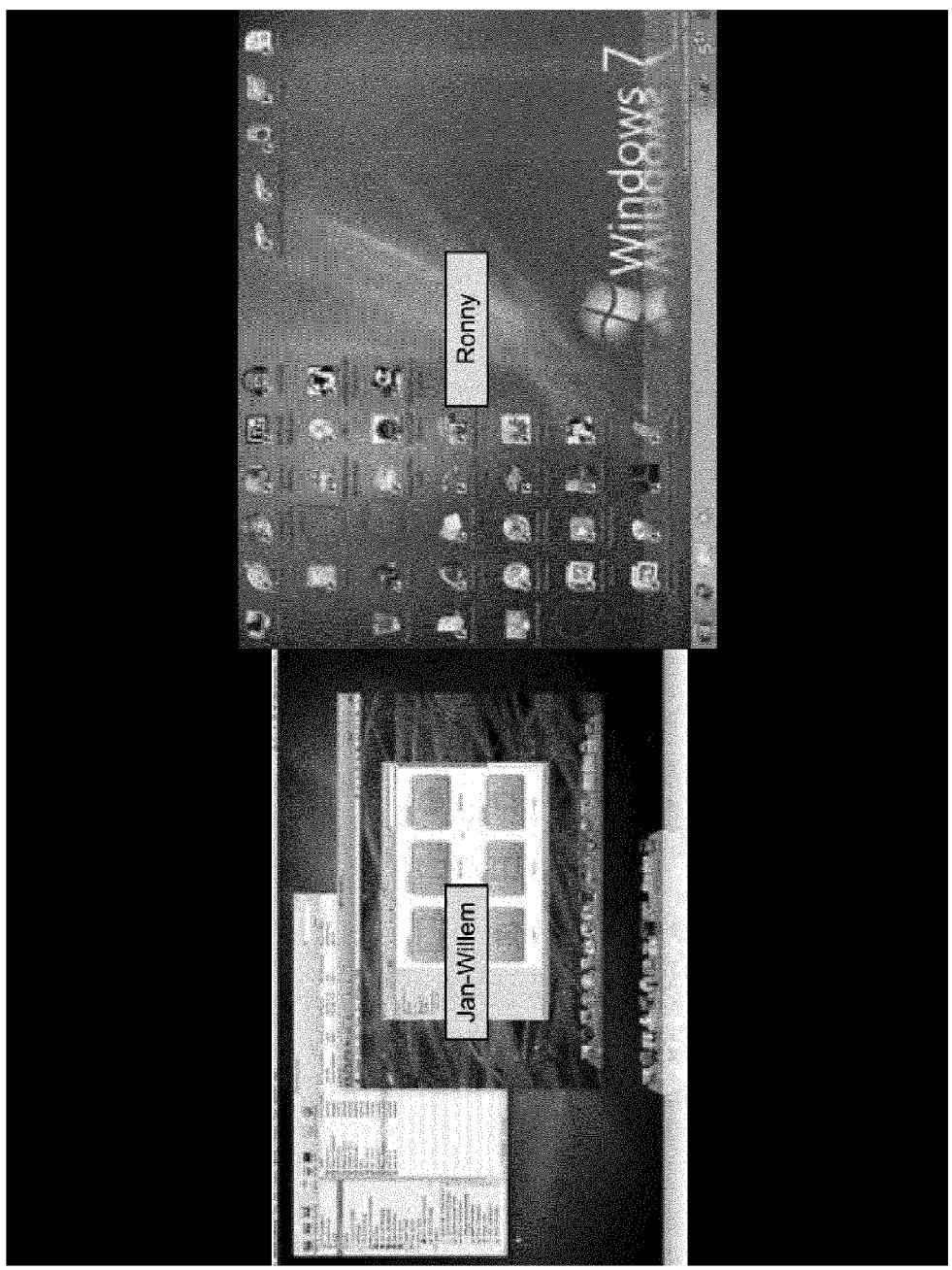

FIG. 14 shows the images from the processing devices of two participants as seen on a local display or a central display.

The user labels in the center of the images can be visible after each change for a few seconds (e.g. when a new processing devices was added to or removed from the meeting).

The token of the user is what the canvas service knows, when a source is connected it asks the user/source service the public user name of the user associated with the source associated with the token from this the user label is known.

Especially in a remote session this is important because it allows all users to associate sources and hence areas on the screens with users, now they can say 'I don't agree with the numbers Piet is showing, even if Piet is remote and not in the room . . . . '

Figure 15:

The image shown in FIG. 15 can be shown at any moment to allow other participants to get access to the session QR code to start sharing of content if they would have missed that opportunity at the beginning of the meeting.

For remote participants a method is provided to communicate the secret (the meeting ID and the URL). This could be a voice instruction, or SMS message as described earlier.

An aspect of the present invention is the realization that verbal communications can be an integral component of the total system. The verbal meaning is interwoven with the visual meaning, not just in the sense that the presentation is a multimedia event (slides and talk), but that the management of the meeting can be a verbal and a (electronic) visual cooperation. For example:

One way of transferring tokens is to verbally communicate them to a remote participant. This assumes the presence of a audio link before anything else and needs a short and simple token string to keep communication errors to a minimum.

By maintaining one single layout (topology) for all meeting participants it is easy to refer to elements on the screen by verbal instruction. Inversely, all screen management that cannot be described in simple words is forbidden.

Since, in this scenario, one can always rely on the presence of an audio channel, one can also use this infrastructure to eliminate or reduce the number of hardware physical peripheral devices and/or virtual on-screen buttons. One can use verbal commands, in combination with voice recognition, to alter the screen layout. The 'virtual button' could be a Siri-like interface:

"Show my screen"
"Enlarge my screen"
"Hide my screen"
"Remove top-right screen"
"Remove all screens"

As described before, users can get access to a token in various ways, by verbal communication, by messaging such as SMS or by scanning a QR code using a camera, e.g. in their smart phone or tablet. The last missing link is a further aspect of the present invention is to connect the user content with the token.

E.g. A user might have a processing device such as a laptop, PC, smart phone or tablet that the user wants to use as a content source in the meeting session, but the user is using a mobile phone to retrieve his token. The user could try to move the token from the phone to the portable processing device PC, e.g. by simply copying it and entering it on a web page on the portable processing device PC, but since this is a repetitive action, i.e. the user would have to do this each time he/she participates in a meeting.

Figure 11:
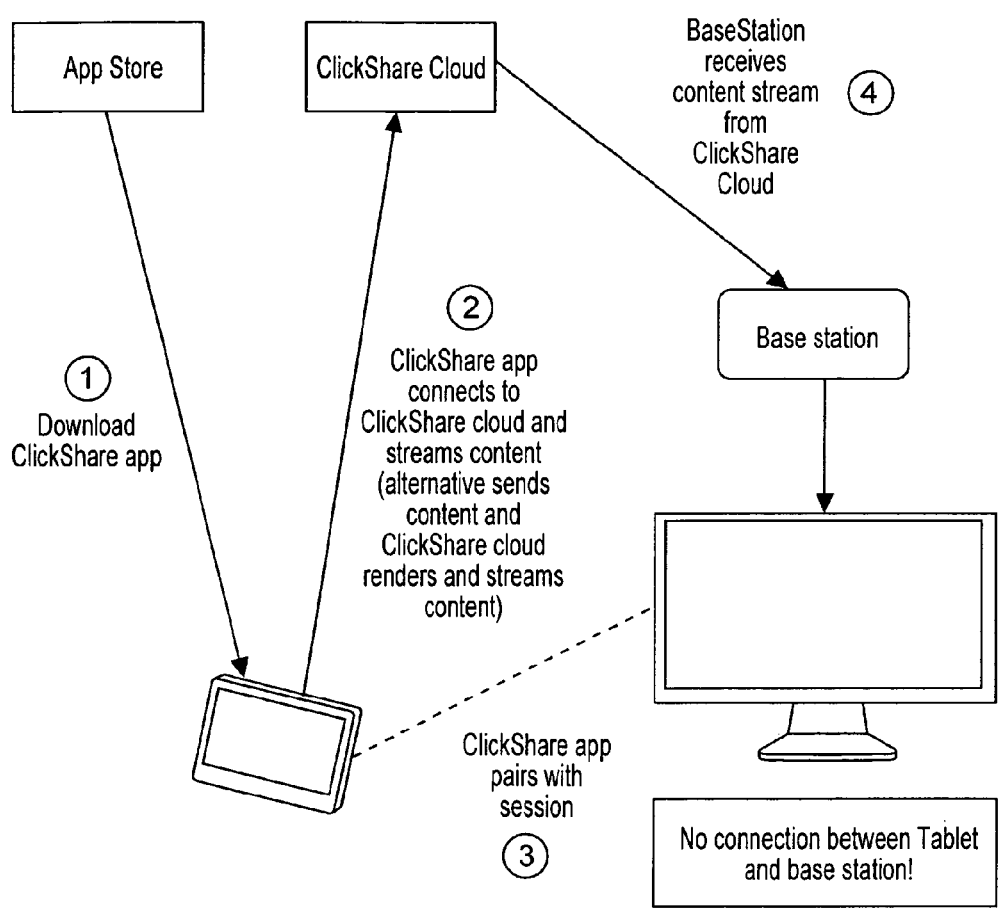
FIG. 11 shows an embodiment using a tablet.

The present invention in another aspect also provides a solution for this problem as shown in FIG. 11. In one embodiment the system or method of the present invention allows the possibility to download and install an application on the mobile device or devices of choice of the user. The user then registers himself/herself at a central service where the user gets assigned an ID. From that application the user can pair computer sources (the user processing device his PC or possibly multiple processing devices such as PC's or tablet computers) with the user ID.

Figure 16:
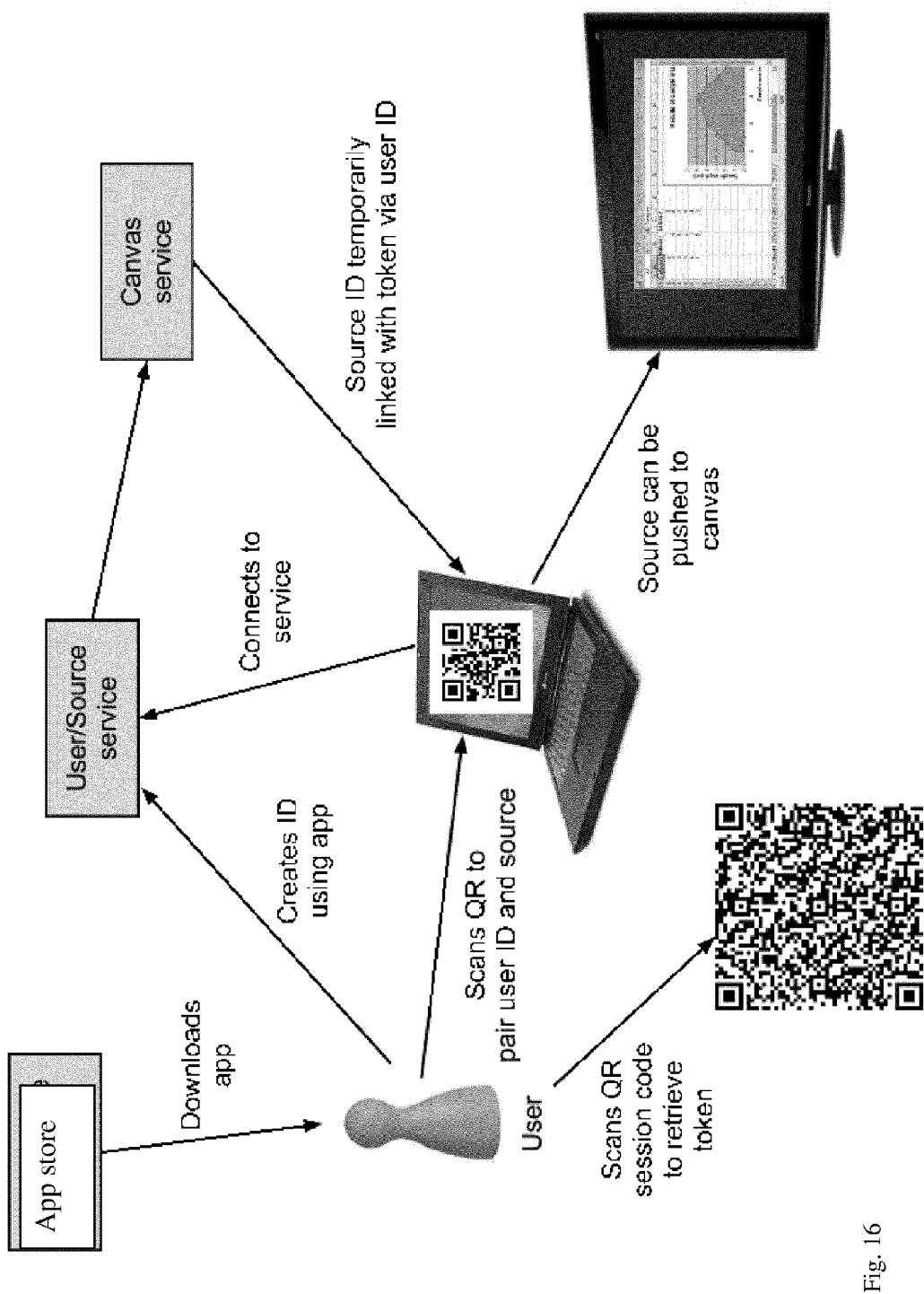
FIG. 16 shows pairing in accordance with an embodiment of the present invention.

The process of pairing a processing device computer source can be as simple as surfing to a web page from the processing device, which will show a unique source ID (e.g. by showing a QR code again). With reference to FIG. 16, by reading the QR code from the PC local screen of the processing device with the mobile device, the PC local processing device gets linked to the user ID. The information is stored on the processing device PC in the form of a cookie or similar approach. If the user source processing device PC can not store permanent data, an alternative way is that the user would point his processing device PC to a web location where the user logs in to the central service, at which moment the source processing device PC gets automatically associated again with the user ID.

Another implementation could be a browser application that plays the same role as the mobile phone app on the processing device PC and that would connect to the central service when the user activates it (example implementation could be a Chrome browser app).

When the user then retrieves a token to participate in a session using the user mobile phone app, the app will allow the user to share the computing source or to select one of the local computing his sources to be added or removed from the canvas cited with the session the token is connected with.

FIG. 11 shows how a tablet could connect leaving a connection to corporate network or the internet, and no integration of the wireless network used for display being in corporate IT. It only requires outbound connectivity of base station, e.g. could be directed straight to a router in DMZ of company.

Here there is a pairing from tablet to session. The app can be for the strongest, non-connected wireless network. The 'session' can be static and named, e.g. a displayed session ID, or by analyzing the content on the screen, e.g. the base station could send fingerprint of content to server that can be computed by the app or the cloud service by sending image of current screen. Since there is an App, it can come with instructions on how to realize the pairing. If the base station has audio input it could be done by a suitable audio message requested by the cloud service.

Figure 12:
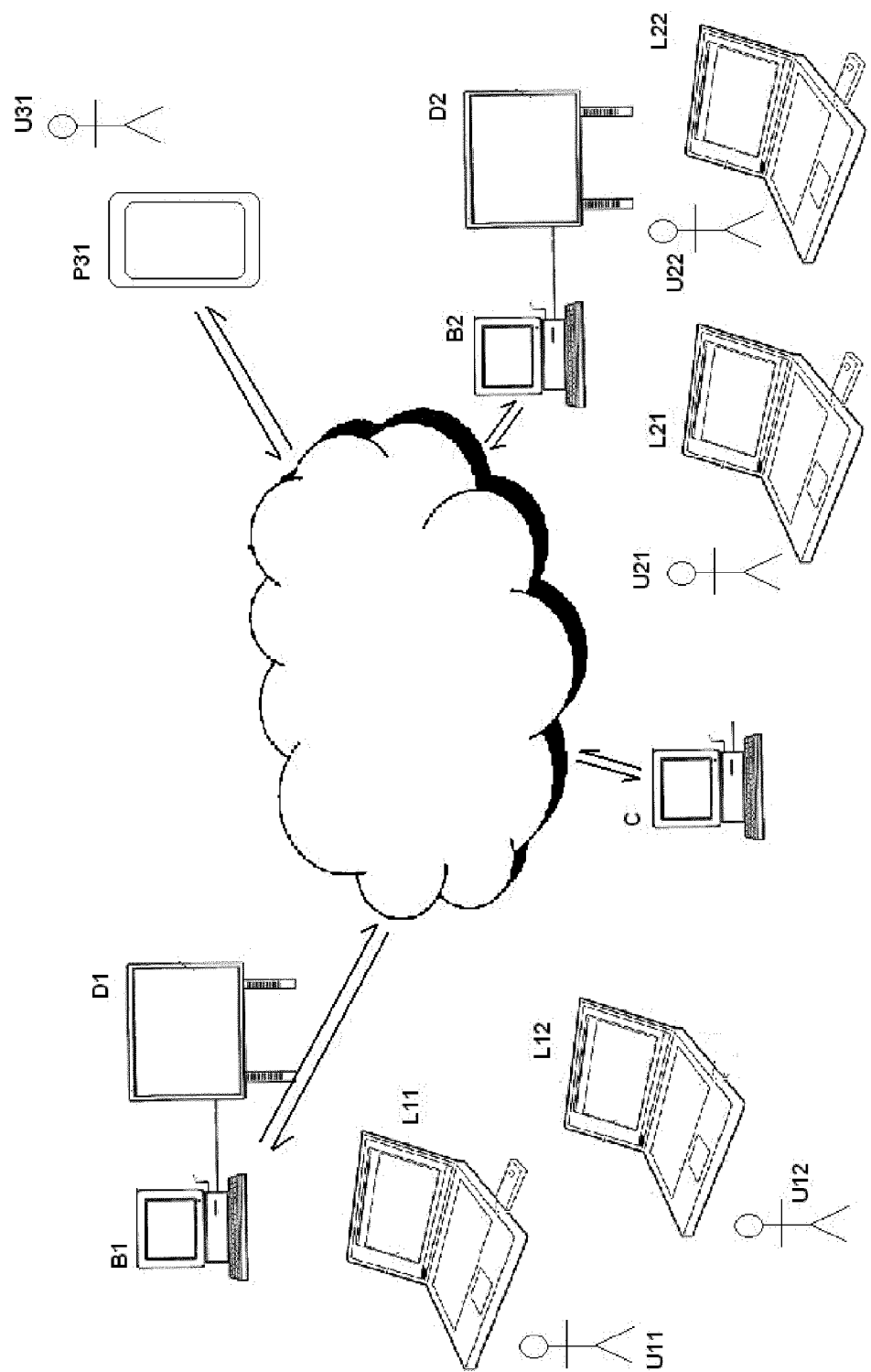
FIG. 12 shows a further embodiment of the present invention.

Referring to FIG. 12, storage in a plug and play peripheral device 1 stores code that is automatically executed by the first processing device when the plug-and-play device is connected to the first processing device via the first plug-and-play interface 1a. When a button 2 on the plug and play device is pressed a first time (first user action), code is executed by the first processing device L11 to initiate a display data exchange between the first processing device and a second computing device, i.e. a base unit or node. The data exchange is preferably done wirelessly (e.g. Bluetooth, IEEE 802.11/Wi-Fi® WiFi, IEEE 802.15.4 and ZigBee . . . ) but could be done via a wired connection. The data exchange between the processing device L11 and the computing device B1 can be done independently of the internet (e.g. direct wireless communication between both computing devices) or through the internet and an intermediary storage device C. The storage device C typically has computing capabilities to extract information from e.g. a data packet, sort it, re-arrange it, create a data file, write to a file, erase specific elements in a file . . . . Unless stated otherwise or made obvious by the context, the case will be discussed where display data is exchanged between computing processing devices like L11, base units like B1 and a storage device C. In that case, display data is sent to storage device C through the generally available communication interface of processing device L11 (Wifi, Ethernet . . . ). Supporting equipment like router(s), LAN hardware, internet provider hardware, land lines, access to GPRS and/or Mobile Phone Network . . . is assumed to be available and not a limitation on the present invention and will not be discussed further. The base unit B1 is for example a computer equipped with among other things a graphical card, a hard disk memory, and with a Processor like e.g. an AMD® Sempron™ 150 (2.9 GHz, 1 MB Cache), an AMD Athlon™ II X2 250 (3.0 GHz, 1 MB cache), an AMD® Athlon™ II X4 645 (3.1 GHz, 2 MB cache), a processing system like e.g. Windows® 7 Professional, 64-bits, a memory e.g. 6 GB Dual Channel DDR3 SDRAM at 1333 Mhz-3 DIMM's a hard disk 1000 GB SATA, an optical station to read CD ROM, a video card like e.g. an ATI Radeon™ HD4200 integrated graphic card, a 512 MB NVIDIA® GeForce G405 graphic card, a 1 GB DDR3 AMD® Radeon™ HD 6450 graphic card or similar graphical cards available off the shelf, a 10/100/1000 Ethernet-LAN on the system card; a wireless communication interface like e.g. a Dell Wireless 1525 802.11n PCIe-network card, a VGA-connection and/or an HDMI™ connection for connection to display D1.

The central storage device C may also be a computer identical or similar to B1 that has been configured as a server.

The display data 3 "screen scraped" from the first processing device L11 is sent to a central storage device C (either directly by L11 or, in another embodiment, by the base unit B1). The information is encoded in e.g. HTML5 including an identifier id identifying the origin, in this example L11, of the screen scraped information. The storage device C is then consulted by the base unit B1 in order to display the display data on display D1.

When the button 2 is pressed a second time, the processing device L11 informs the central storage C that the screen scraped display data 3 must be erased. In a first embodiment, the central storage C informs the base unit B1 that the display data has been altered. B1 then consults the central storage C and upload the display data still available on C and displays it on D1. In the simple example given here above, assuming that no display data was available on C prior to pressing button 2 a first time, no display data will remain on C and no data will be displayed on D1 (e.g. black screen if D1 is an Liquid Crystal Display). The identifier may be any practical marker that can be encoded in the data packet sent by a processing device as L11. This could be an IP address, a MAC address, a unique identifier recorded in the plug and play device (e.g. a number assigned to the plug and play device as it is assembled by either programming a flash memory, setting a dipswitch . . . ). In the case of a smart phone P31 discussed further in this description, the unique identifier could be the phone number itself. Biometrics could also be used to identify a user and assign the user an identifier id.

In a second embodiment, L11 communicates with the base unit B1 which in turn informs C that it must erase the display data 3 from its memory. In a particular case, communication with the base unit B1 is done through the plug and play device 1 equipped with an RF interface.

In the remainder of the description, unless stated otherwise, pressing the button (or the equivalent actions described further) and the eventual impact on the data displayed on D1/available on the memory device C will be referred to as an "event".

The plug and play device might be replaced by e.g. a code running on the processing device L11. In that case the button 2 is replaced by a (well defined) zone of a touch screen (as might be the case for a smart phone) or a key on the keyboard of a laptop computer. The zone of the touch screen that will trigger an event might be either indicated by a displayed icon. Alternatively, no icon will be displayed and an event will be triggered by "swiping" the touch screen. Other alternative methods include gesture recognition made by a camera connected to the computing device, voice recognition and activation, fingerprint sensing . . . .

Several users e.g. U11, U12, U13 equipped respectively with computing devices (e.g. "laptop computers") L11, L12 or smart phones like P13 are gathered in a first meeting room R1 equipped with a base unit B1 and a display D1. A first processing device L11 is equipped with a peripheral device d11 while another, L12, will rely on a key of its keyboard (or an alternative sensor) to trigger an event while Smart phone P13 will rely on its touch screen.

In another meeting room R2 geographically remote from R1, users U21, U22, U23 . . . are equipped with computing devices L21, L22, L23 . . . equipped with plug and play devices d21, d22, d23 . . . or one of the alternative to trigger an event.

In yet another location, e.g. a hotel room, a car . . . a "road warrior" U31 makes use of a smart phone P31 to communicate with users U11, U12 . . . U23 . . . .

An event will be identified by a set of indices i, j and k. Indices i and j represents a user at the origin of an event (example: i=2 and j=1 represents an event triggered by user U21). Index k is either 1 (button 2 of plug and play device d21 is pressed a first time and display data screen scraped on e.g. processing device L21 is sent to and stored on C and displayed on D1, D2 and P31) or 2 (button 2 is pressed a second time and display data d21 is erased from C and disappears from display D1, D2, P31)

The proposed set-up allows any of the users to share display data at the same time with all the other users on the displays D1 and D2 and on the display of smart phones like P31 by triggering a first event. The set-up allows any user to withdraw her/his contribution to the data displayed on D1, D2 and P31 by triggering a second event.

The data displayed on D1, D2 and P31 depends on (a) display data sent by any of the computing devices to the memory device C and stored in C and (b) a configuration document CD updated at each event and stored on C.

The display data stored in C and structured by the configuration document may be referred to as the Canvas in this description.

For an event Eij1, display data screen scraped from the display of a processing device Lij (or Pij) is sent to the storage device C together with an identifier idij.

The temporal sequence with which display data is received by the storage device C is recorded under the form of a temporal index m. The temporal sequence is determined by e.g. the time of the local clock at C upon receipt of display data ddij. Alternatively, the temporal index for an event Eij is determined by the time of the local clock of Lij expressed in GMT or Universal Time.

If the storage device C receives contribution from more than one processing device Lij (or Pij) the configuration document is updated to reflect this.

In a first example (for the configuration document), the configuration document will assign to received display data DDij from processing device Lij/Pij (a) an identifier idij (b) a temporal index mij and (c) metadata concerning the source (e.g. name or identifier of user Uij). The metadata can be superimposed to the corresponding display data on displays D1, D2 . . . .

Based on the number of contributions, the configuration document will determine the layout for the combined display data. Example: if contributions from 2 computing devices Lij/Pij are received, the configuration document assigns half of the display space on D1 and D2 to each of the display data ddij.

If contributions from 3 or 4 computing devices Lij/Pij are received, the configuration document assigns a quarter of the display space on D1 and D2 to each of the display data ddij.

If contributions from more than 4 computing devices are received, the configuration document assigns a quarter of the display space on D1 and D2 to the four display data ddij with the most recent temporal index mij.

For an event Eij2, the display data from processing device Lij/Pij is erased from the storage device C, the corresponding identifier idij and temporal index mij disappears from the Configuration Document CD and the data displayed on D1 and D2 will be modified accordingly, for instance, according to the example given here above.

The display D1 and D2 might have different characteristics (resolution, dimension of the active display area . . . ). In order for all users to have access to (as close as possible) to identical visual data, displays D1 and D2 (with or without support from their base unit) use the configuration document to determine if the display data ddij must be re-sized to fill the screen's full height or width.

More generally, the display data ddij to be displayed are mapped by a transform function TFi that optimizes the visual appearance on each particular display by means of e.g. interpolation, de-interlacing, size re-sampling; choice of resolution, frame rate, color depth, gamma, brightness, contrast . . . according to the needs of users Uij in their meeting room Ri. Aspect ratio and boundaries between contributions ddij are conserved.

The configuration document contains a tagged mark-up language description of the image to be displayed If display data DDij is variable, the corresponding temporal index mij is kept constant and equal to its earliest value (e.g. upon reception of the first data packet).

The configuration document may be or may contain a tagged mark-up language description of the image to be displayed. Languages/formats/styles such as SGML, XML, SVG can be used, for example.

The configuration document may comprise a full description of the image content to be displayed. The full description may be defined in the document by means of a network address for the display data ddij.

A relevant property of SVG drawings is that they can be dynamic and interactive. Time-based modifications to the elements can be described in SMIL (Synchronized Multimedia Integration Language), or can be programmed in a scripting language (e.g., ECMAScript or JavaScript). The W3C explicitly recommends SMIL as the standard for animation in SVG. The SVG drawings may for instance be edited or transformed according to the example developed earlier whenever an Event Eij requires it. A related example of canvas as meant in this description is a dynamic web page created by server side scripting (such as PHP, Perl, JSP or ASP.NET) before being sent to a "client" (e.g. a base unit) for display/rendering on a browser running on the client side.

More detailed examples of how the display data stored on the storage device C can be distributed to remote displays D1 and D2 is given in U.S. patent application Ser. No. 11/487,357 published under number US20070033289 "Network displays and method of their operation" by Geert Nuyttens and Ronny Dewaele. Examples of hardware needed to display graphical information sent by C are given in U.S. patent application Ser. No. 11/487,357 as well.

The techniques described in U.S. patent application Ser. No. 11/487,357 are particularly relevant when e.g. the display D1 in meeting room 1 consists of two (or more) separate display screens e.g. two 82" LCD screens mounted side by side. The configuration document generated at C will determine how the canvas will be distributed over the two displays. Building up on the earlier example where maximum 4 contributions are displayed on the (then single screened) D1, the display data ddij with the latest temporal index mij may be displayed on the first of the separate displays in meeting room 1, and doing so making the latest contribution more visible to the participants, while the other contributions ddij will be displayed on the second separate display in meeting room 1. The same is done in meeting room 2 assuming that a second screen is also available in meeting room 2. The techniques described in U.S. Ser. No. 11/487,357 are leveraged to take into account e.g. failure of one of the two or more displays in the same meeting room and allow to continue the meeting with as little disturbance as possible.

When a processing device Lij shares data with others through the base unit Bi with the support of a plug and play interface 1, some adaptations are needed to set-up/draft the configuration document.

(1) Display data ddij is sent to the base station Bi. Data display dij is time stamped either by the local clock of Lij or that of Bi. The time stamp tij is expressed as GMT or universal time.

(2) The display data ddij is sent by the base station Bi to the storage device C where the temporal index mij is determined based on the time stamp tij. This guarantees that the users and the event they trigger in different meeting rooms will get the same priority regardless of differences in transmission time between the various meeting rooms and the storage device C.

(3) The Canvas is assembled based on the display data ddij and the temporal indices mij as was done when the computing devices Lij communicated directly (i.e. without using Bi as an intermediary) with the storage device C.

When a base station is required to access the storage device C, a specific procedure is required to allow "road warrior" U31 to share display data with the users U11, U12 . . . U21 . . . .

A token (i.e. an authorization and means to alter the display data ddij stored on C) is needed to be transferred by verbal instruction and needs to convey the means to make a contribution to the canvas. One way to implement the token is the combination of a URL plus a unique session ID. The combination of these two gives access to a meeting-specific website that serves two purposes: (1) to download and install screen capture software program and (2) to give access to the shared canvas. The combination of (1) and (2) offers remote participants like road warrior U31 using laptops or smart phones the same functionality as participants with access to the base units B1 or B2. Since the verbal instruction needs to be concise, a service similar to tinyURL.com (or lilURL or TightURL) will be used to combine the website+session ID. To avoid mistakes the shortened URL will use a sub-set of characters that are easily pronounced and avoid language confusion (such as between G & J or I & E). An example is hexadecimal characters only. When the phone number of P31 is used as an identifier for U31, it can be verified by the downloaded screen capture software program or accessed by the website itself. In that later case, the phone number may be used to authorize access to the canvas C through the website.

Road Warrior U31 having no access to displays D1 or D2 will have to rely on local display means to see the display data dij visible to Users U1j and U2j. The screen of a smart phone being far smaller than the screen of a display like D1 and D2 used in meeting rooms, the configuration document is used advantageously together with a transform function. For instance, having recognized that the screen of smart phone P31; geographically remote from displays D1 and D2; has smaller dimension and resolutions, information like the temporal index can be used to display only one contribution ddij at a time on the screen of smart phone P31. Switching from one of the maximum 4 (in the example treated above) data display ddij to another may be done by road warrior U31 by scrolling, clicking a specific key on his/her smart phone or "swiping" on a touch screen of P31.

Instead of being done by voice over the phone, the invitation to join the virtual meeting between participants U11, U12 . . . U21 . . . U31 may be sent by e-mail pr through social media. User U31 merely has to click the url indicated in the invitation, the web site will verify the phone number of P31 and U31 will be able to see and share display data with the other participants.

The integration of voice command issued by users Uij and display data increases the focus of participants Uij and in particular participants like "road warrior' U31 who has only access to a small display screen on his/her smart phone P31.

To that end, the computing devices Lij is equipped with off the shelf voice recognition software. When a user, e.g. U12 issues a voice command, digital information VC is generated as a result by the voice recognition software. That digital information can be linked through e.g. a look-up table to an instruction that can be interpreted by server side scripting and trigger a real time modification of the canvas e.g. the dynamic web page discussed previously. Example 1: a voice command like "zoom top corner left" will result in the top left corner of the canvas (as visible before the voice command is issued) being zoomed in and occupying e.g. the full screen of display D1, D2 and more importantly the screen of smart phone P31. Example 2: if the layout of data display is limited to maximum 4 contributions as described previously, the voice command could be "top left" "top right", "bottom left" and "bottom right". Based on those information, server side scripting would tailor the displayed data on smart phone P31 and only the top left or . . . or bottom right contribution would fill in the screen of smart phone P31.

Returning to FIG. 2, the base node software (6) running on a base node 36 can be adapted to display on the central display a splash screen (21) showing its readiness to receive arbitrary media content over its receiver. This splash screen (21) can also show instructions on how to use the system, as well as the configuration parameters (see later) to reach the base node 36. These configuration parameters are also shown in a transparent canvas at the bottom of the central display (22).

A client processing device 31 that wants to have its arbitrary media content displayed on the central display connected to the base node 36 is connected to a connection unit 47. The portable application 60 will be executed on the client processing device 31 as a host device. A first user interaction creates a connection between the portable application 60 and the base node 36 using the transmitter in the connection unit 47 and the receiver in the base node 36. A second user interaction, this time on the input device 48, activates screen scraping by the portable application of the arbitrary media content from the client processing device display, which is then sent over the connector unit 47 to the base node.

The base node 36 receives the plurality of arbitrary media content coming from one or more connection units 47, and auto composes this media content for rendering on the central display.

The visual indicator 61 on the connection unit 47 indicates to the user and to other participants in the meeting that media content is being sent by that connection unit 47 to the base node 36 for display.

Repeating the second user interaction on the input device 48 of a connection unit 47 decouples the media content from that connection unit 47 from the base node 36. The base node 36 removes that media content from the composed image on the central display and recomposes the remaining content on the central display.

Figure 2:
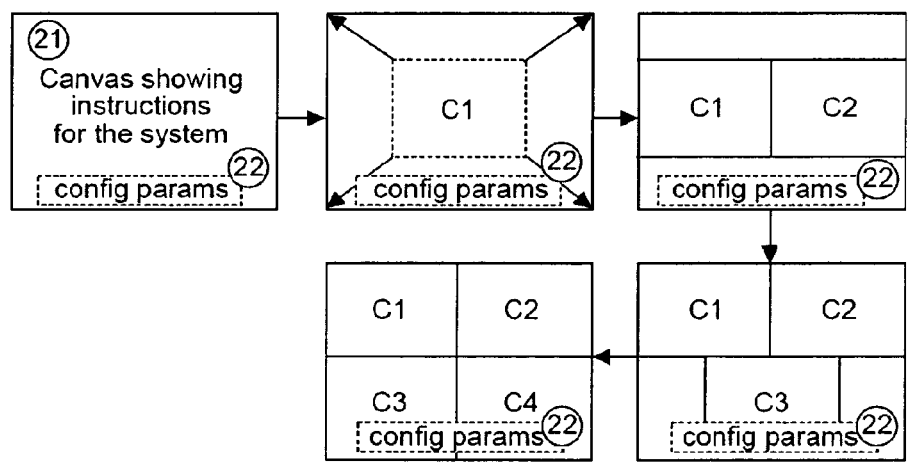
FIG. 2 shows a screen display in accordance with an embodiment of the present invention.
Figure 3:
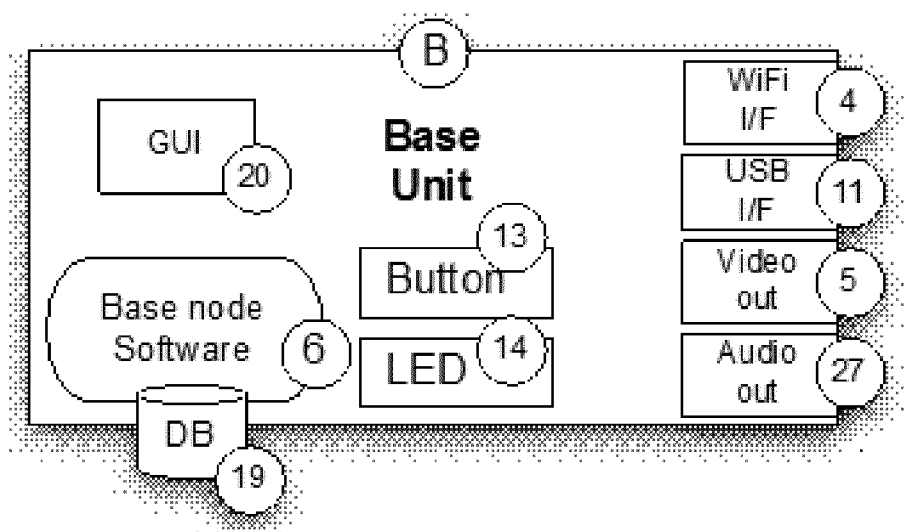
FIGS. 3 to 5 show a base node and a peripheral device and a client processing device in accordance with embodiments of the present invention.
Figure 4:
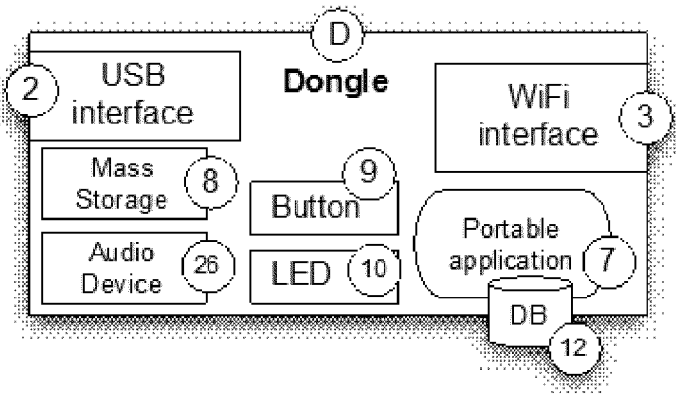

The content on the central display/projector is auto arranged as shown in FIG. 2. When user 1 adds content, his/her display will be scaled to fill the available central display canvas as much as possible, but without affecting the aspect ratio. When user 2 adds in, his content is added to the side of the first image. When user 3 adds his content, the arrangement is triangle wise. Adding user 4, the image becomes a 2 by 2 tiling, which is the maximum available. When an additional user attempts to add content, he will be blocked. When a user initiates action to remove his/her content, his/her media content is removed from the central display and one moves backward in the composition sequence shown in FIG. 2.

Base Node Software

The base node software has one or more of the following features:

First code for providing a means or a method step for correctly configuring the receiver of the base node.

Second code for providing a means or a method step for listening for output of connection units trying to connect on a specific port.

Optionally, third code for providing a means or a method step for a GUI for administration purposes, offered for example over a web interface.

Optionally, fourth code for providing a means or a method step for publishing its presence over the network using the zeroconf protocol.

Optionally, fifth code for providing a means or a method step for accepting and installing software updates of the base node as well as for the portable application software for the connection units.

Sixth code for providing a means or a method step for providing facilities for pairing of connection units to the base node.

Seventh code for providing a means or a method step for auto-composing of different incoming arbitrary media streams and rendering of composited image on display or projector screen.

Eighth code for providing a means or a method step for receiving, decrypting and decoding incoming arbitrary media content.

Optionally ninth code for providing a means or a method step for scaling of incoming arbitrary media streams Optionally tenth code for providing a means for displaying incoming arbitrary media content in accordance with a set of one or more rules.

Any of the above code may be stored on a non-transitory machine readable storage medium such as an optical disk, a magnetic disk, magnetic tape, solid state memory etc.

Portable Application for the Client Processing Device

The portable application comprises an algorithm for screen scraping. Screen scraping algorithms include VNC and RDP or similar. The algorithm may include a combination of algorithms such as VNC and RDP that are optimized for different content, e.g. static text or video. The portable application has one or more of the following features:

Eleventh code for providing a means or a method step for connecting to a network including the base node.

Twelfth code for providing a means or a method step for capturing video frame buffers of the client processing device, i.e. computer (C), also called screen scraping.

Thirteenth code for providing a means or a method step for encoding, compressing and optionally encrypting these video frames and sending them over a secure link to the base node. Only changed areas such as rectangles or triangles of the screen need to be transferred, and different types of rectangles or triangles are encoded in different ways (e.g. RLE, JPEG, . . . ) to optimise performance.

Fourteenth code for providing a means or a method step for handling the connection unit.

Fifteenth code for providing a means or a method step for initiating connection to base node.

Sixteenth code for receive inputs from the input device on the connection unit.

Seventeenth code for providing a means or a method step for sending state changes to the visual indicator on the connection unit.

Optionally, eighteenth code for providing a means or a method step for presenting the user a GUI (18).

Optionally, nineteenth code for presenting GUI for administration of the portable application.

Optionally, twentieth code for providing a means or a method step for displaying and activating a key on the display of the client processing device for allowing a user input to start the transfer of data from the client device to the base node.

Any of the above code may be stored on a non-transitory machine readable storage medium such as an optical disk, a magnetic disk, magnetic tape, solid state memory etc.

In this embodiment the portable application stored on the connection unit, and is executed in an execution context on the client processing device. The portable application does not need to be copied to or installed on the computer. It can be executed directly from the connection unit. It will only be copied temporarily into an execution context on the client processing device. There are also no changes in configuration or settings in the client processing device. This means that nothing will remain on the client processing device when the connection unit is removed. It also implies that the portable application will run on client processing devices where the user does not have the necessary access rights to install software.

The portable application is designed in such a way that

No specific drivers need to be installed on the client processing device.

Pre-installed drivers are used, e.g. for classes of peripheral devices.

It is independent from vendor specific graphics hardware.

It runs on at least one and preferably on a variety of different client processing devices, including Windows, Mac OS/X, Linux, Android, iOS and many others.

Advantages

The present application has one or more of the following advantages:

No need for a master role in the meeting

Standard plug and play connectivity of connection units to base node

Simple and well known user actions are employed

Own networking facilities of client processing devices not blocked

No configuration changes on the client processing device

Input devices are easily accessible; e.g. large size

Program updates of portable application and server program can be performed locally Portable applications are used, no installation, multi-platform, no vendor specifics Particular implementation of screen scraping done by portable application avoids vendor specific graphics devices Standard drivers are used hence no driver has to be installed No configuration changes on the client processing devices Zero footprint applications on client processing devices—nothing to clear up or adjust or reset Own networking facilities of client processing devices not blocked No configuration changes on the user computers Low virus, malware and spyware risk The portable application may be stored on a non-transitory machine readable storage medium such as an optical disk, a magnetic disk, magnetic tape, solid state memory, USB mass storage etc.

Second Embodiment

In the second embodiment, referring to FIGS. 2 to 5, the base node is a separate physical processing device called base unit (B), comprising permanent storage, memory, a processing engine, a wireless access point (4), a plug and play interface such as a USB port (11), a graphics display output adapter (5) like VGA/DP/DVI/HDMI, and optionally an audio output adapter (27). An input device having an actuator such as a button 13 and a visual indicator 14 are optional.

The connection unit is a physical device in the form of an external peripheral device (shown in the drawings as a "dongle" D) comprising permanent storage storing the portable application (7) and configuration parameters (12), memory, a processing engine (e.g. CPU, FPGA), a wireless transmitter such as WiFi (3), a plug and play interface such as a USB interface (2), a button as input device (9), an LED ring as visual indicator (10). The portable application is stored on the peripheral device (7).

The client processing device is host device, for example a computer or laptop comprising a display, a plug and play interface such as a USB port (2), memory, and a processing engine such as a microporcessor.

The system thus comprises an external peripheral device (D) that has a plug and play interface such as a USB interface (2) on one end and a communications interface such as a wireless interface configured as client (3) on the other end.

a base unit (B) that has a communications interface such as a wireless interface configured as access point on one end (4) and a video card adapter (5) like VGA, DVI, DP or HDMI on the other end.

a portable application (7) stored on the peripheral device (D) but executed on the client processing device (C)

a base node software (6) stored and executed on the base unit (B)

The external peripheral device (D) also preferably has any one or any combination of:

a large button as actuator for the input device (9) allowing user interaction with the peripheral device. The button preferably has an actuation surface area of between 100 and 14,400 square mm.

visual indication such as a LED (10) allowing user feedback from the peripheral device An advantage of embodiments of the present invention is to provide data transfer to the peripheral device via a peripheral interface such as a USB interface on any processing device such as a computer in a manner that is largely operating system independent and without leaving a footprint (Zero-Footprint). Installation of drivers and/or applications onto such a processing device as a computer is not necessary wherever pre-installed generic drivers are present. Administrator rights on the processing device such as a computer are preferably not necessary. To avoid the need for administrator rights, embodiments of the present invention use other peripheral device pre-installed drivers such as USB class drivers supported without any extra installation.

Embodiments of the present invention route at least screen scraped data presented by client software running on the processing device for transfer to a communications network via a peripheral device such as a USB device. This bypasses any network interface of the processing device (and hence many firewalls) but only for the specific client software. Other applications are not affected and can make use of the standard network interfaces, i.e. packets from/to the TCP/IP stack are transferred to a network device as normal. The client software is launched from the peripheral device such as a USB composite device or storage device as a portable application, which can avoid that any traces are left on the host OS.

Basic Usage Scenario of the Second Embodiment

Figure 5:
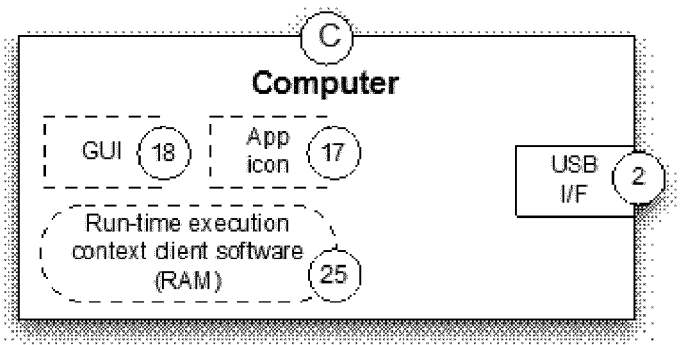

The base node software (6) displays on the projector a splash screen—(21) in FIG. 5—showing its readiness to receive arbitrary media content over its receiver (4). This splash screen (21) also shows instructions on how to use the system, as well as the configuration parameters (see later) to reach the base node. These configuration parameters are also shown in a transparent canvas at the bottom of the central display (22).

To avoid user interaction for the configuration of the connection between peripheral device and base unit, a pairing process is used. This pairing process provides the peripheral device, i.e. the connection unit with networks parameters needed to set up the local network. As an example, the peripheral device can be briefly plugged into the USB port (11) of the base unit (B). The base unit then optionally does a software validity check, optionally does a software update of the portable application stored on the peripheral device, and writes the connection parameters on the peripheral device (D) required for the peripheral device and base unit to find each other to the permanent storage (8). For example, when using WiFi, this would be the SSID, WEP/WPA2 keys and IP address of the base unit's receiver, as well as the port number used by the base node software although not all of these need to be exchanged.

A client processing device that wants to have its arbitrary media content displayed on the central display connected to the base node (5) connects a peripheral device (D) to its USB port via (2). The peripheral device presents itself to the computer over interface (2) as a composite device comprising a mass storage device and a keypad. This has the major advantage that no specific driver is required, since all these devices are natively supported in every personal computer system that has a USB port. If autorun is enabled, then the computer will automatically execute the client software (7) stored in mass storage (8) on the peripheral device. The first user interaction mentioned in the general case is then just the connection of the peripheral device to the USB port. If security measures disabled auto-run, the user needs to explore the mass storage on the mass storage of the peripheral device and start the portable application manually.

The portable application will use the wireless, e.g. WiFi interface of the peripheral device (3) to connect to the correct base node. To know the right base unit to connect to, the configuration parameters needed to make this connection are stored in the database (12) on the mass storage device (8) during the pairing process described earlier.

Once the connection is made, the peripheral device goes into connected mode. This means that there is now at least one channel from the peripheral device to the base unit. The content is not shown yet. The LED (10) on the peripheral device now turns white to give a visual indication of this new state.

Figure 6:
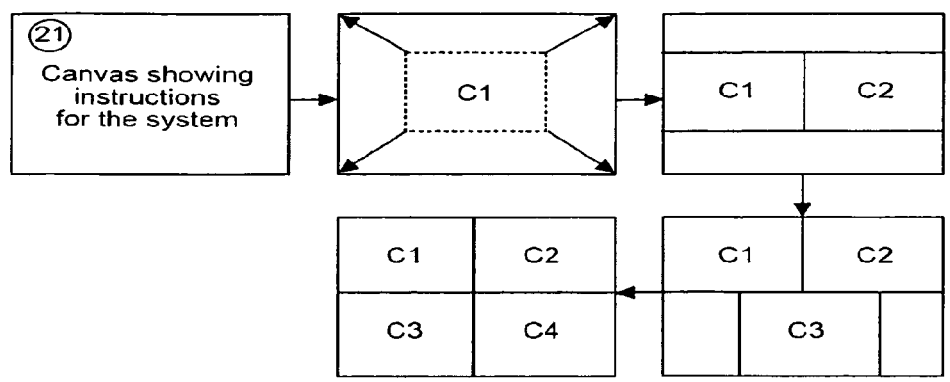
FIG. 6 shows a display in accordance with an embodiment of the present invention.

When the user at the computer (C) wants to show her content, she presses the button (9). When the button was previously in state "connected" (see FIG. 6), it will check the state of the base unit (P). If the base unit is not in state "full", the peripheral device will send the screen scraped arbitrary media content to the base unit (B), which will add the media content to the composition on the central display. The peripheral device LED (10) now turns red to indicate "showing" state (FIG. 6).

The button (9) acts as a toggle. When the user presses the button again, that computer displays content will be removed from the projector. The LED (10) goes back to white.

Use of the auto-run feature is optional if possible and enabled on the computer (C) to start the client software (7) as soon as the peripheral device is plugged in. On Windows for example, this means mounting the peripheral device as a mass storage device and using the autorun.inf file stored on the peripheral device.

In many cases however, this auto-run feature will be disabled for security reasons. In that case, we will, if possible and enabled on the computer (C), use the auto-play feature to show the logo of the connected peripheral device on the desktop of the computer. The user then needs to double click on that logo to start the client software. If the auto-play feature as described above is also not possible or enabled, the user must browse to the file system of the connected peripheral device and start the application manually. This means double clicking the client.exe file on Windows, client.app on Mac OS/X or tapping the appropriate application icon on a tablet or any mobile device with touch screen.

Figure 7:
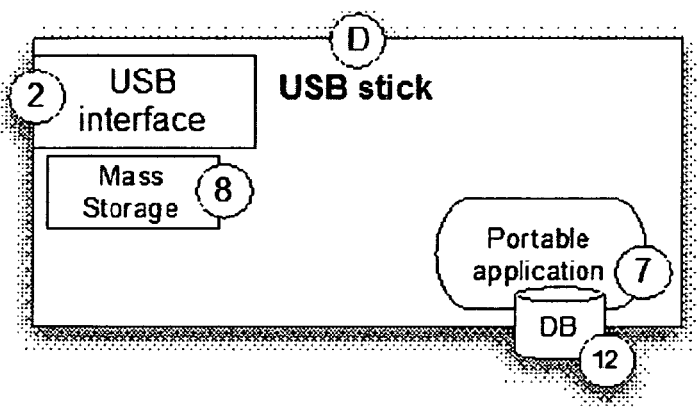
FIG. 7 shows a peripheral device in accordance with an embodiment of the present invention.

Third Embodiment: Portable Application Stored on Standard Solid State Memory Such as a USB Stick In the third embodiment, the portable application is stored on a solid state memory such as a regular USB memory stick (FIG. 7).

With a solid state memory such as a regular USB memory stick, there is no input device, visual indicator or transmitter of the kinds described above for the connection unit. This means that the system needs to:

Use the transmitter/receiver from the client processing device.
Use as input device a key or button on the client processing device like a physical key on the keyboard, a special mouse press, a button area on a touch screen, a button displayed on the screen to be clicked on with a mouse pointer.
Present the visual indicator on the client processing device's display.

Figure 8:
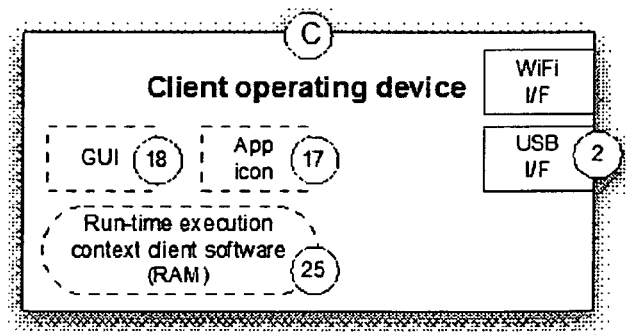
FIG. 8 shows a client processing device in accordance with an embodiment of the present invention.

The client processing device then looks like FIG. 8.

This embodiment provides a peripheral interface such as the USB interface on any processing device acting as a host device such as a computer in a manner that is largely operating system independent. Installation of drivers and/or applications onto such a processing device as a computer is not necessary wherever pre-installed generic drivers are present. Administrator rights on the processing device such as a computer are preferably not necessary. To avoid the need for administrator rights, this embodiment uses other peripheral device pre-installed drivers such as USB class drivers supported without any extra installation. This embodiment of the present invention routes at least screen scraped data presented by client software running on the processing device for transfer to a communications network via a network connection of the processing device. The client software is launched from the peripheral device such as the USB device as a portable application.

The first user operation then comprises:
plugging in the solid state device such as a USB memory stick,
starting the portable application (if autorun is disabled)
configuring the transmitter on the client processing device to connect to the correct base node, using the configuration parameters (22) shown on the central display
triggering the connection of the portable application with the base node, for example by interacting with an element on the GUI (18) of the portable application presented on the display of the client processing device.

Presenting visual feedback on user actions is in this embodiment also done using elements in the GUI of the display of the client operating device.

In this embodiment, the advantage of zero footprint is partly realized by the portable application in the sense that no software is installed on or copied to the client operating device, but there is a configuration change needed to connect the transmitter of the client operating device with the base node, which needs to be undone afterwards.

Optionally, the portable application can make the configuration changes to the transmitter for the user.

Advantages lost in this embodiment
Partial loss of zero footprint nature of portable application
More complex first user interaction
More expertise required from user
GUI needed on client operating device display, which is possibly also shown on central display
Need to find free key on client operating device when using physical key for second user action
Network interface is blocked from other uses by portable application Optionally, the last point can be avoided by using the base unit as a gateway to the network that the client operating device wanted to connect to through its own interface.

Advantages are:
tight control of user connectivity to corporate network through settings on the base unit
keep network connectivity intact even when transmitter is now also used for display purposes Disadvantage is a higher vulnerability of the system because the display connection is now possible a doorway into the corporate network.

Figure 9:
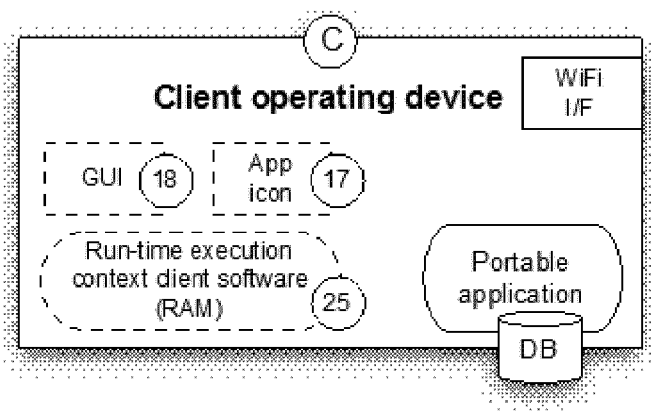
FIG. 9 shows a further client processing device in accordance with an embodiment of the present invention.

What remains as advantages are
the availability of a physical medium to distribute the portable application to users
no need to install or copy software to client operating device
easy way to maintain software updates on the connection units (here: memory sticks) via the base unit
possibility to write configuration data on the connection unit by the base unit, for example in the form of a configuration profile that can be read and used by the client operating device Fourth Embodiment: Software Only Client Installed on the Client Processing Device This embodiment is similar to the third embodiment, with as only difference that the software is copied on the client operating device (FIG. 9). In this case, no plug and play port such as a USB port is required on the client operating device.

This embodiment will typically be used for tablet PC's and mobile devices. In that case
there is often no USB port available
application distribution is easy and widely accepted through application stores Fifth Embodiment: Base Node Software OEM'ed to Projector or Display Equipment In this embodiment, the base node is not realized as a separate physical box, but integrated into the processing unit inside a display or projector. All other details are as previously described.

Sixth Embodiment

In this embodiment, the base node is not realized as a separate physical box, but integrated into the codec of a video conferencing equipment. All other details are as previously described.

Seventh Embodiment: Remote Meeting Participant

In this embodiment, one or multiple client operating devices are not in the direct vicinity of the base node but on a remote location.
To accommodate this case, the following adaptations are needed:
further compression and or scaling of the arbitrary media content to allow use of low bandwidth connection
possibility to communicate connection parameters of the base node to a remote user
connectivity of the base node to the WAN network to which the remote user is connected
All other details are as previously described.

Eighth Embodiment: Multiple Base Nodes

Figure 10:
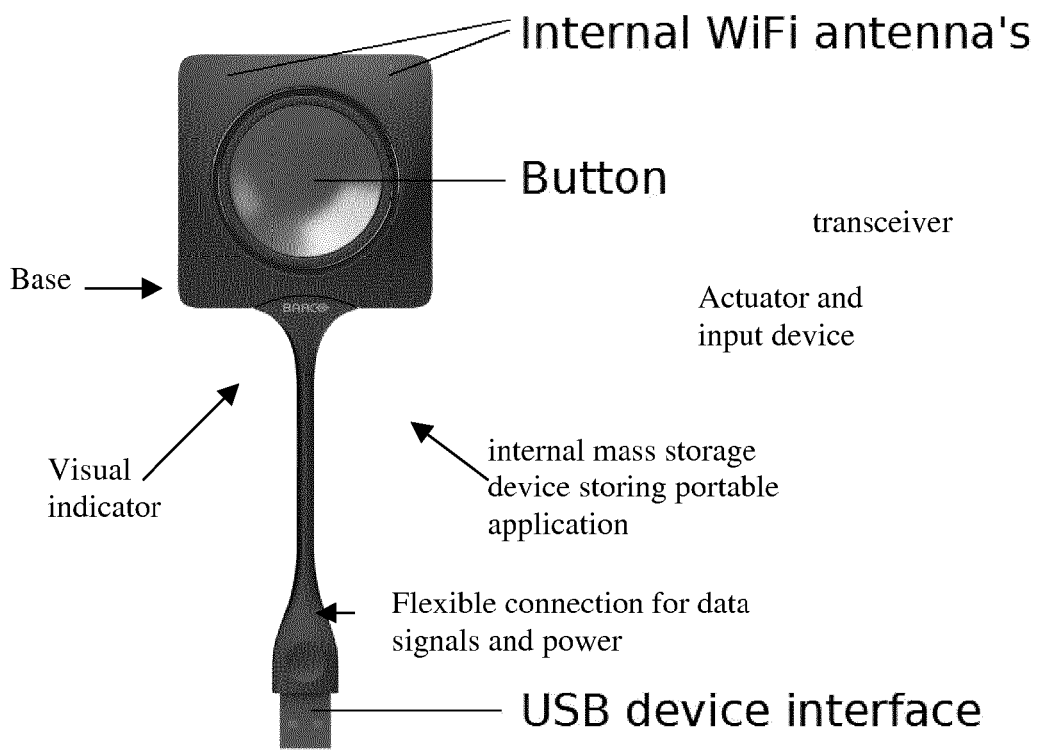
FIG. 10 shows an embodiment of a peripheral device in accordance with an embodiment of the present invention.

In this embodiment, multiple base nodes are used. This can be done for different purposes:
connectivity of multiple central displays
extension of real estate of central display
connectivity of base nodes in different remote locations
This provides the advantage that one can present on multiple base units from a single peripheral device. This is useful for a number of cases:
personal peripheral device: user can have a personal peripheral device that is paired with multiple meeting rooms that he regularly uses
use in meeting room with multiple base units each controlling a different display in the same meeting room
The proposal uses a special variant of the peripheral device called a multi base peripheral device. The multi base peripheral device is equipped with a rotating wheel around the circular central "show me" button. This could be a mechanical rotating multi-position switch or something like the touch wheel on the iPod classic.
The pairing of this multi-base variant of the peripheral device:
the rotation wheel is put in the position of the corresponding base unit.
the peripheral device is paired to the base node in the regular way
the configuration parameters are stored in a permanent storage location; every position of the rotating wheel has a corresponding set of connection parameters (e.g. different rows in a table) each corresponding with a particular base
The connection of the peripheral device is as follows:
multi-base peripheral device X is plugged into a PC
rotation wheel on peripheral device X is put in position A
peripheral device X reads configuration parameters in position A of its internal memory
peripheral device X connects to base node A
base node A indicates connection of multi-base peripheral device X on central display screen
rotation wheel on peripheral device X is put in position B
peripheral device X reads configuration parameters in position B of its internal memory
peripheral device X connects to base node B
base node B indicates connection of multi-base peripheral device X on screen
continue until correct base is selected with rotation wheel
click the peripheral device input device e.g. button to show content on central display of base node
rotating the wheel always first clicks away content from the base of the last position Ninth Embodiment FIG. 10 shows a peripheral device 47 in accordance with an independent embodiment of the present invention including an input device. This embodiment can be used with any of the embodiments described above.
The peripheral device is configured as a connection unit and is a physical device in the form of a connector for a plug and play interface of a user processing device as a host computer such as a USB connection, a flexible data and power connection connected to the connector and a base, the base having an actuator, e.g. a button configured to be an input device with the functions as described above.
The base and/or the actuator is preferably large in size, e.g. having a surface area between 100 and 14,400 square mm. The base can be square, rectangular, round, hexagonal, oval, polygonal in shape or any other ergonomically suitable shape. The actuator is preferably round but can be square, rectangular, hexagonal, oval, polygonal in shape etc. there can be more than one actuator on one base.
The length of the flexible data and power connection, e.g. cable is preferably adapted to place the peripheral device (when in its connected in its operating position), especially the base and the actuator, in the region between the boundary of the connected user processing device and the ergonomic boundary as defined above. In addition the flexible data and power connection should be adapted so that the base lies flat on the meeting table independent of the orientation of the connector needed to insert the connector into the plug and play interface.
The base preferably includes electronics such as having permanent storage for storing the portable application and the network configuration parameters, memory, a processing engine (e.g. CPU, FPGA), a wireless transmitter/receiver such as for WiFi, a plug and play interface such as a USB interface, a LED ring as visual indicator. The portable application can be stored on the peripheral device, i.e. in the base. The visual indicator is for allowing user feedback from the connection unit of the status of any activity.
Some examples for activation of the actuator which can be used with any of the embodiments of the present invention
Sound activated (hand clap, voice recognition, computer sound, music, . . . )

Remote controlled via wireless connected device (IR, Bluetooth, WiFi, . . . )
Light activated
Pressure activated, e.g. depression with a finger or hand.
Touch activated
Proximity ('near-touch' on the actuator or bringing the actuator close to some object
Biometric reader such as Fingerprint reader, Iris scanner, DNA analyser
Keypad, e.g. for entering Keycode e.g. a password Alternative Embodiments In the above embodiments, once the connection is made between the connection device and a host computer, the peripheral device goes into connected mode. This means that there is at least one channel from the peripheral device to the base node. In accordance with any of the embodiments of the present invention a plurality of channels can be set up between the connection device and the base node. These channels may be logical channels.

Some examples for such a multichannel arrangement may include the first and one or more of the additional channels:
First channel is for the Scraped image stream (XDS)
Second channel is for GPU commands (OpenGL, DirectX)
Third channel is for Mouse pointer coordinates (absolute, relative)
Fourth channel is for Mouse pointer icons
Fifth channel is for Image data files (JPEG, PNG, GIF, . . . )
Sixth channel is for Multimedia data files or streams (MPEG2, MPEG4, OGG, H.26x, . . . )
Seventh channel is for Audio data files or streams (MP3, MP4, AAC, WMA, . . . )
Eighth channel is for text or Document data files (DOC, DOCX, PPT, PPTX, ODT, ODS, PDF, . . . )
Ninth channel is for transmission of a priority value 1, 2, 3 . . . as described above.

In the above embodiments, a particular method of pairing the peripheral device with the base node has been described. Any of the embodiments of the present invention may include other pairing mechanisms of which some examples are given below.
Some examples for pairing
Plug in the peripheral device, to a generic peripheral device port such as a USB port of the base node or other USB enabled device. Pairing info is transmitted over the generic peripheral interface such as USB.
The Signal strength of the wireless channel to the base node is used to identify which base nod is to be used
The Signal strength of the wireless channel or any other channel. Example is an NFC/RFID transmitter can be provided underneath the meeting room table. Putting the user processing device such as a laptop and the peripheral device plugged in on this table automatically pairs the peripheral device with the base of this meeting room
Manual pairing (e.g. by entering IP address, hostname, wireless ID (like SSID on WiFi))

What is claimed is:

1. A method for displaying arbitrary media content on a display device and to override all currently displayed material when arbitrary material is presented on the display device from more than one source processing device, the arbitrary media content being obtained from processing devices in a meeting with a plurality of participants, the media content being transmitted through a communications network, each processing device having a memory and a display, the method comprising:
providing a shared canvas on which all visual information is stored, the canvas being mapped to the display device, the canvas being maintained in a location that makes the canvas electronically accessible, making a change on the canvas being dependent upon possession of a token,
and for the media content of any or each participant having a processing device:
receiving the token, the token when transferred to the communications network inherently or discretely providing authentication or permission to display the arbitrary media content on the display device, the token also providing a link to the display device;
obtaining the arbitrary media content by screen scraping data from the processing device;
routing the screen scraped arbitrary media content through the communications network from the processing device;
obtaining electronic access to the display device; and
displaying the arbitrary media content.

2. The method according to claim 1 further comprising connecting the processing device to the communications network, the processing device having an operating system with at least one pre-installed generic driver providing a generic communications protocol for communication between processing device and a class of peripheral devices, the method comprising the steps of:
a) coupling a peripheral device to the processing device, the peripheral device having a transceiver;
b) setting up, by means of the pre-installed generic driver of the operating system, a means for communication between the peripheral device and the processing device;
c) coupling the processing device to a communications network via the peripheral device;
d) routing screen scraped data between the processing device and the communication network via the means for communication, wherein the generic communication protocol is used for transferring the screen scraped data between the processing device and the peripheral device.

3. The method of claim 2 wherein Step b) comprises presenting the peripheral device to the processing device as a human interface device and wherein the pre-installed generic driver is a human interface device driver.

4. The method of claim 2 wherein Step b) comprises presenting the peripheral device to the processing device as a mass storage device and wherein the pre-installed generic driver is a mass storage device driver.

5. The method of claim 2 wherein Step b) comprises presenting the peripheral device to the processing device as a composite device and wherein pre-installed generic drivers drive different device interfaces independently.

6. The method of claim 2 wherein a client application is stored on the peripheral device which when run on the processing device obtains the screen scraped data.

7. The method of claim 6 wherein the client application is a portable application.

8. The method according to claim 1, further comprising operating a display node of the communications network, the display node being coupled to a first display, to receive user selected arbitrary media content and to control display of the user selected arbitrary media content on the first display; and connecting a peripheral device to a port of a processing device and communicating the user selected arbitrary media content via the communications network, loading a program onto the processing device and running the program on the operating system of the processing device to obtain user selected arbitrary media content, said program leaving a zero footprint on termination, and triggering transfer of said user selected arbitrary media content to said transmitter through said port after a user action on an input device.

9. The method according to claim 1 further comprising setting up a communications network between a base node of the communications network and a peripheral device coupled to the processing device;

transferring media content between the processing device and the peripheral device, transmitting the media content from the peripheral device to the communications network, receiving media content from the communications network at the base node and displaying the media content on a display in accordance with a set of rules.

10. The method according to any claim 1 wherein the peripheral device is paired to the processing device.

11. The method according to claim 1, wherein the token is received by a voice communication transferring the token.

12. The method according to claim 1, wherein the displaying the arbitrary media content further comprises overriding all currently displayed material when the arbitrary material is presented on the display device from more than one source processing device.

13. A system for displaying arbitrary media content on a display device and to override all currently displayed material when arbitrary material is presented on the display device from more than one source processing devices, the arbitrary media content being obtained from processing devices in a meeting with a plurality of participants, the media content being transmitted through a communications network, each processing device having a memory and a display, the system comprising:

a shared canvas on which all visual information is stored, the canvas being mapped to the display device, the canvas being maintained in a location that makes the canvas electronically accessible, making a change on the canvas being dependent upon possession of a token, and for the media content of any or each participant having a processing device, the system is adapted to provide the token, the token when transferred to the communications network inherently or discretely providing authentication or permission to display the arbitrary media content on the display device, the token also providing a link to the display device;

wherein each processing device comprises an application, where when said application is executed by a processor, the processing device:

obtains the arbitrary media content by screen scraping data from the processing device;

routes the screen scraped arbitrary media content through the communications network from the processing device;

obtains electronic access to the display device; and a display node for displaying the arbitrary media content.

14. The system according to claim 13 further comprising means for connecting the processing device to the communications network, the processing device having an operating system with at least one pre-installed generic driver providing a generic communications protocol for communication between processing device and a class of peripheral devices, the system comprising:

a) means for coupling a peripheral device to the processing device, the peripheral device having a transceiver;

b) means for setting up, by means of the pre-installed generic driver of the operating system, a means for communication between the peripheral device and the processing device;

c) means for coupling the processing device to a communications network via the peripheral device;

d) means for routing screen scraped data between the processing device and the communication network via the means for communication, wherein the generic communication protocol is used for transferring the screen scraped data between the processing device and the peripheral device.

15. The system of claim 14 further comprising means for presenting the peripheral device to the processing device as a human interface device and wherein the pre-installed generic driver is a human interface device driver.

16. The system of claim 14 further comprising means for presenting the peripheral device to the processing device as a mass storage device and wherein the pre-installed generic driver is a mass storage device driver.

17. The system of claim 14 further comprising means for presenting the peripheral device to the processing device as a composite device and wherein pre-installed generic drivers drive different device interfaces independently.

18. The system of claim 13 wherein a client application is stored on the peripheral device which when run on the processing device obtains the screen scraped data.

19. The system of claim 18 wherein the client application is a portable application.

20. The system according to claim 13 further comprising means for operating a display node of the communications network, the display node being coupled to a first display, to receive user selected arbitrary media content and to control display of the user selected arbitrary media content on the first display; and means for connecting a peripheral device to a port of a processing device and communicating the user selected arbitrary media content via the communications network, loading a program onto the processing device and running the program on the operating system of the processing device to obtain user selected arbitrary media content, said program leaving a zero footprint on termination, and means for triggering transfer of said user selected arbitrary media content to said transmitter through said port after a user action on an input device.

21. The system according to claim 13 further comprising means for setting up a communications network between a base node of the communications network and a peripheral device coupled to the processing device;

means for transferring media content between the processing device and the peripheral device, means for transmitting the media content from the peripheral device to the communications network, means for receiving media content from the communications network at the base node and for displaying the media content on a display in accordance with a set of rules.

22. The system according to claim 13 wherein peripheral device is paired to the processing device.

23. The system according to claim 13, wherein the system is adapted to provide the token by a voice communication transferring the token.

* * * * *